(12) United States Patent
Xiong et al.

(10) Patent No.: US 11,212,563 B2
(45) Date of Patent: Dec. 28, 2021

(54) VIDEO STREAM SWITCHING METHOD, APPARATUS, AND SYSTEM

(71) Applicant: Huawei Technologies Co., Ltd., Shenzhen (CN)

(72) Inventors: Jie Xiong, Nanjing (CN); Jinhui Zhang, Shenzhen (CN); Ji Li, Nanjing (CN); Zhigui Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/197,156

(22) Filed: Mar. 10, 2021

(65) Prior Publication Data

US 2021/0204007 A1   Jul. 1, 2021

Related U.S. Application Data

(63) Continuation of application No. PCT/CN2019/103935, filed on Sep. 2, 2019.

(30) Foreign Application Priority Data

Sep. 11, 2018   (CN) .......................... 201811058553.7

(51) Int. Cl.
   *H04N 21/236*    (2011.01)
   *H04N 21/234*    (2011.01)
   *H04N 21/438*    (2011.01)
   *H04N 21/44*     (2011.01)

(52) U.S. Cl.
   CPC ..... *H04N 21/23602* (2013.01); *H04N 21/234* (2013.01); *H04N 21/4383* (2013.01); *H04N 21/44* (2013.01)

(58) Field of Classification Search
   None
   See application file for complete search history.

(56) References Cited

U.S. PATENT DOCUMENTS

| 2008/0205507 A1 | 8/2008 | Komiya et al. |
| 2011/0164178 A1 | 7/2011 | Hardy et al. |
| 2012/0098923 A1 | 4/2012 | Westin |

(Continued)

FOREIGN PATENT DOCUMENTS

| CN | 1694529 A   | 11/2005 |
| CN | 101047848 A | 10/2007 |

(Continued)

OTHER PUBLICATIONS

RFC 3550, Schulzrinne, H., "RTP: A Transport Protocol for Real-Time Applications," Jul. 2003, 89 pages.

*Primary Examiner* — Justin E Shepard
(74) *Attorney, Agent, or Firm* — Conley Rose, P.C.

(57) ABSTRACT

A video stream switching method includes receiving, by transmission device, a plurality of video streams of a first video and a plurality of video streams of a second video, sending the video streams of the first video through target output ports respectively corresponding to the video streams of the first video, after receiving a switching instruction, determining switching reference information of a reference end-of-frame packet of each video stream of the first video and the second video, determining switching reference information of a switching packet of the video stream, and switching from the video streams of the first video to the video streams of the second video based on the switching reference information of the switching packet of each video stream.

20 Claims, 10 Drawing Sheets

(56) References Cited

U.S. PATENT DOCUMENTS

| | | |
|---|---|---|
| 2013/0301830 A1 | 11/2013 | Bar-El et al. |
| 2017/0359611 A1 | 12/2017 | Iguchi et al. |
| 2018/0054649 A1 | 2/2018 | Li et al. |
| 2019/0260999 A1 | 8/2019 | Xiong et al. |

FOREIGN PATENT DOCUMENTS

| | | |
|---|---|---|
| CN | 101917390 A | 12/2010 |
| CN | 106162235 A | 11/2016 |
| CN | 107018379 A | 8/2017 |
| CN | 107086963 A | 8/2017 |
| CN | 107135169 A | 9/2017 |
| CN | 107770538 A | 3/2018 |
| CN | 107888909 A | 4/2018 |
| EP | 2369840 A1 | 9/2011 |
| EP | 3185564 A1 | 6/2017 |
| WO | 2010017656 A1 | 2/2010 |

| 1 | 1 | 2 | 2 | 1 | 1 | 2 | 2 | ............................................ |
| 3 | 3 | 4 | 4 | 3 | 3 | 4 | 4 | ............................................ |
| 1 | 1 | 2 | 2 | 1 | 1 | 2 | 2 | ............................................ |

⋮

| 1 | 1 | 2 | 2 | 1 | 1 | 2 | 2 | ............................................ |
| 3 | 3 | 4 | 4 | 3 | 3 | 4 | 4 | ............................................ |

VIDEO STREAM SWITCHING METHOD, APPARATUS, AND SYSTEM

CROSS-REFERENCE TO RELATED APPLICATIONS

This application is a continuation of International Patent Application No. PCT/CN2019/103935 filed on Sep. 2, 2019, which claims priority to Chinese Patent Application No. 201811058553.7 filed on Sep. 11, 2018. The disclosures of the aforementioned applications are hereby incorporated by reference in their entireties.

TECHNICAL FIELD

Embodiments of the present disclosure relate to the field of multimedia communications technologies, and in particular, to a video stream switching method, an apparatus, and a system.

BACKGROUND

In the field of multimedia communications technologies, for example, in the television (TV) production and broadcasting field, there is a scenario of switching between video streams sent by different video source devices. For example, during live broadcast of a football game, received video streams obtained by shooting different positions of a stadium may be switched on a transmission device (for example, a router), to implement switching and displaying of video pictures at different angles of the stadium on a video terminal.

In the conventional TV production and broadcasting field, a video stream is usually transmitted in a serial digital interface (SDI) format. A maximum length of a coaxial cable for transmitting an SDI signal is usually limited and the coaxial cable is relatively expensive. Therefore, in the TV production and broadcasting field, an Internet Protocol (IP) network starts to be used to transmit a video stream. For example, an SDI signal is carried in an IP packet for transmission.

In the multimedia communications field, especially in the TV production and broadcasting field, video quality gradually evolves from high definition to ultra-high definition. A bit rate of an ultra-high-definition video reaches ~4000 (4K) pixels or even ~8000 (8K) pixels, and an amount of transmitted data correspondingly increases to four or eight times that of a high-definition video. Because an existing SDI interface cannot meet a transmission requirement of the ultra-high-definition video, or due to another reason, the ultra-high-definition video is usually divided into a plurality of high-definition videos, and the plurality of high-definition videos are encapsulated into a plurality of video streams for transmission.

In the other approaches for switching a video stream transmitted through an IP network, when determining that video streams need to be switched, a transmission device stops sending a data packet of each video stream of a video from which the transmission device needs to switch, and starts to send a data packet of each video stream of a video to which the transmission device needs to switch.

Video stream switching according to the other approaches usually causes damage to a video picture.

SUMMARY

Embodiments of the present disclosure provide a video stream switching method, an apparatus, and a system, to resolve a other approaches problem that video stream switching causes damage to a video picture.

According to a first aspect, a video stream switching method is provided. The method includes that a transmission device receives a plurality of video streams of a first video and a plurality of video streams of a second video, and sends the plurality of video streams of the first video through target output ports respectively corresponding to the plurality of video streams of the first video, where the plurality of video streams of the first video are used to encapsulate different sub-images of a video frame of the first video, and the plurality of video streams of the second video are used to encapsulate different sub-images of a video frame of the second video. In addition, after receiving a switching instruction used to instruct to switch from the video streams of the first video to the video streams of the second video, the transmission device determines switching reference information (such as a sequence number) of a reference end-of-frame packet of each video stream of the first video, and determines switching reference information of a switching packet of the video stream based on the switching reference information of the reference end-of-frame packet of the video stream, and determines switching reference information of a reference end-of-frame packet of each video stream of the second video, and determines switching reference information of a switching packet of the video stream based on the switching reference information of the reference end-of-frame packet of the video stream, where reference end-of-frame packets of all video streams of the first video are used to encapsulate data of a same video frame of the first video, and reference end-of-frame packets of all video streams of the second video are used to encapsulate data of a same video frame of the second video. Further, the transmission device switches, to the plurality of video streams of the second video based on the switching reference information of the switching packet of each video stream, from the plurality of video streams of the first video that are sent through the target output ports respectively corresponding to the plurality of video streams of the first video.

The switching reference information of the reference end-of-frame packet and the switching reference information of the switching packet that are of each video stream of the first video and the second video each may be a sequence number or a timestamp, or each may include both a sequence number and a timestamp.

In an implementation of the first aspect, a sequence number of a switching packet of each video stream of a to-be-switched-away video (namely, the first video) and a to-be-switched-to video (namely, the second video) is determined based on sequence numbers of end-of-frame packets of the to-be-switched-away video that correspond to a same video frame and sequence numbers of end-of-frame packets of the to-be-switched-to video that correspond to a same video frame, and video stream switching is performed based on the sequence number of the switching packet. During video stream switching, a location of a data packet sent before the switching and a location of a data packet sent after the switching are considered. Therefore, damage caused by a switch operation to a transmitted video picture can be effectively alleviated.

In a first implementation of the first aspect, the switching reference information of the reference end-of-frame packet of each video stream of the first video is determined based on a synchronization relationship among all the video streams of the first video, and the switching reference information of the reference end-of-frame packet of each video stream of the second video is determined based on a synchronization relationship among all the video streams of the second video.

In this implementation, because a synchronization relationship among all video streams of each video is considered, switching reference information (such as sequence numbers) of reference end-of-frame packets of each video stream that belong to a same video frame can be accurately determined.

Based on the first aspect or the first implementation of the first aspect, in a second implementation of the first aspect, for any video (which is referred to as a target video below) in the first video and the second video, switching reference information of a reference end-of-frame packet of each video stream of the target video is determined in the following manner.

Switching reference information of a reference end-of-frame packet of a reference video stream of the target video is determined based on a synchronization reference packet of the target video, where the reference video stream is one of a plurality of video streams of the target video, the synchronization reference packet is the $x^{th}$-to-last end-of-frame packet that is of the reference video stream and that is received before the switching reference information of the reference end-of-frame packet of each video stream of the target video is determined, and x is a natural number and may be 1.

For each video stream other than the reference video stream in the plurality of video streams of the target video, switching reference information of a reference end-of-frame packet of the other video stream is determined based on switching reference information of the $x^{th}$-to-last end-of-frame packet that is of the other video stream and that is received before the switching reference information of the reference end-of-frame packet of the other video stream is determined, and a synchronization relationship between the other video stream and the reference video stream.

In this implementation, for any video (namely, the target video) in the first video and the second video, switching reference information of reference end-of-frame packets of all video streams is determined based on switching reference information of the $x^{th}$-to-last end-of-frame packets of the video streams, and determined timestamps of the reference end-of-frame packets of the video streams are relatively close to each other. Therefore, switching packets with relatively consistent timestamps can be more accurately determined, so that damage caused by a switch operation to a transmitted video picture is further alleviated.

Based on the second implementation of the first aspect, in a third implementation of the first aspect, the transmission device may determine the synchronization relationship between the other video stream and the reference video stream based on a timestamp of the synchronization reference packet and a timestamp of the $x^{th}$-to-last end-of-frame packet that is of the other video stream and that is received before a sequence number of the reference end-of-frame packet of the other video stream is determined.

In this implementation, because the synchronization relationship is determined based on the timestamps of the $x^{th}$-to-last end-of-frame packets of the reference video stream and the other video stream, the synchronization relationship may reflect a synchronization status existing when the transmission device receives the $x^{th}$-to-last end-of-frame packets of the reference video stream and the other video stream. Therefore, the switching reference information of the reference end-of-frame packet of the reference video stream and the switching reference information of the reference end-of-frame packet of the other video stream that are determined in consideration of both the synchronization relationship and the switching reference information of the $x^{th}$-to-last end-of-frame packets of the reference video stream and the other video stream better conform to a real synchronization status of video streams of the target video. Therefore, switching packets with relatively consistent timestamps can be more accurately determined, so that damage caused by a switch operation to a transmitted video picture can be further alleviated.

Based on the second or the third implementation of the first aspect, in a fourth implementation of the first aspect, x may be 1, and for each video stream of the first video and the second video, a video frame to which video data in a switching packet of the video stream belongs may be a next video frame or a subsequent video frame of the next video frame of a video frame to which video data in the reference end-of-frame packet of the video stream belongs. In a specific implementation, the switching reference information of the reference end-of-frame packet and the switching reference information of the switching packet that are of each video stream of the first video and the second video each include a sequence number. Correspondingly, a sequence number of the switching packet of the video stream may be calculated based on a sequence number of the reference end-of-frame packet of the video stream and a quantity of packets for encapsulating a single sub-image of the video stream, and a difference between the determined sequence number of the switching packet of the video stream and the sequence number of the reference end-of-frame packet of the video stream may be greater than or equal to the quantity of packets for encapsulating the single sub-image of the video stream. In another specific implementation, the switching reference information of the reference end-of-frame packet and the switching reference information of the switching packet that are of each video stream of the first video and the second video each include a timestamp. Correspondingly, a timestamp of the switching packet of the video stream may be calculated based on a timestamp of the reference end-of-frame packet of the video stream and duration of a single video frame of a video to which the video stream belongs, and a difference between the determined timestamp of the switching packet of the video stream and the timestamp of the reference end-of-frame packet of the video stream may be greater than or equal to the duration of the single video frame of the video.

Video stream switching may be performed at a location later than the reference end-of-frame packet by at least one frame in this implementation. This can effectively avoid damage to a video picture that is currently being transmitted.

Based on any one of the first aspect or the first to the fourth implementations of the first aspect, in a fifth implementation of the first aspect, for a first video stream of the first video and a second video stream of the second video, switching reference information of a switching packet of the first video stream and switching reference information of a switching packet of the second video stream are determined in the following manner, where the first video stream is any one of the plurality of video streams of the first video, and the second video stream is a video stream that corresponds to the first video stream and that is in the plurality of video streams of the second video.

The transmission device determines switching reference information of an alignment end-of-frame packet of the first video stream based on switching reference information of a reference end-of-frame packet of the first video stream and a synchronization relationship between the first video stream and the second video stream, and determines the switching reference information of the switching packet of the first video stream based on the switching reference information of the alignment end-of-frame packet of the first video stream, and determines switching reference information of an alignment end-of-frame packet of the second video stream based on switching reference information of a reference end-of-frame packet of the second video stream and the synchronization relationship, and determines the switching reference information of the switching packet of the second video stream based on the switching reference information of the alignment end-of-frame packet of the second video stream. The alignment end-of-frame packet of the first video stream corresponds to the alignment end-of-frame packet of the second video stream in terms of time.

The switching reference information of the reference end-of-frame packet, the switching reference information of the switching packet, and the switching reference information of the alignment end-of-frame packet that are of each video stream of the first video and the second video each may be a sequence number or a timestamp, or each may include both a sequence number and a timestamp.

In this implementation, the alignment end-of-frame packet of the first video stream and the alignment end-of-frame packet of the second video stream that are determined when the synchronization relationship is considered correspond to each other in terms of time. Therefore, a first switching packet and a second switching packet that are respectively determined based on the alignment end-of-frame packet of the first video stream and the alignment end-of-frame packet of the second video stream also correspond to each other in terms of time. In this way, damage caused by a switch operation to a transmitted video picture can be further alleviated.

Based on the fifth implementation of the first aspect, in a sixth implementation of the first aspect, the switching reference information of the alignment end-of-frame packet of the first video stream may be directly used as the switching reference information of the switching packet of the first video stream, and the switching reference information of the alignment end-of-frame packet of the second video stream may be directly used as the switching reference information of the switching packet of the second video stream. In other words, the alignment end-of-frame packet of the first video stream is directly used as the switching packet of the first video stream, and the alignment end-of-frame packet of the second video stream is directly used as the switching packet of the second video stream.

In this implementation, video stream switching may be performed at a video frame boundary. This can effectively avoid damage caused by a switch operation to a transmitted video picture.

Based on the fifth implementation of the first aspect, in a seventh implementation of the first aspect, switching reference information of a data packet used to encapsulate blanking interval data of a sub-image next to, in time order, a sub-image to which video data in the alignment end-of-frame packet of the first video stream belongs may be determined as the switching reference information of the switching packet of the first video stream, and switching reference information of a data packet used to encapsulate blanking interval data of a sub-image next to, in time order, a sub-image to which video data in the alignment end-of-frame packet of the second video stream belongs may be determined as the switching reference information of the switching packet of the second video stream.

In this implementation, video stream switching may be performed at a data packet used to encapsulate blanking interval data. Because the blanking interval data is not valid video data and is invisible to human eyes, damage to valid video data can be avoided.

Based on any one of the fifth to the seventh implementations of the first aspect, in an eighth implementation of the first aspect, the transmission device may determine the synchronization relationship between the first video stream and the second video stream based on a timestamp of the reference end-of-frame packet of the first video stream and a timestamp of the reference end-of-frame packet of the second video stream.

In this implementation, because the synchronization relationship is determined based on the reference end-of-frame packet of the first video stream and the reference end-of-frame packet of the second video stream, the synchronization relationship may reflect a synchronization status existing when the transmission device receives the reference end-of-frame packet of the first video stream and the reference end-of-frame packet of the second video stream. Therefore, the switching reference information of the switching packet of the first video stream and the switching reference information of the switching packet of the second video stream that are determined based on a combination of the switching reference information of the reference end-of-frame packet of the first video stream, the switching reference information of the reference end-of-frame packet of the second video stream, and the synchronization relationship better conform to a real synchronization status of video streams. In this way, damage caused by a switch operation to a transmitted video picture can be further alleviated.

Device synchronization has a precision deviation. Therefore, timestamps of data packets sent from different video source devices at a same moment may have a deviation. In addition, data is transmitted in a form of a packet in an IP network, and a jitter of packet forwarding may cause some synchronization deviations. Therefore, if a timestamp deviation between reference end-of-frame packets of two video streams is less than a preset time difference threshold, it may be considered that the two video streams are synchronous.

Correspondingly, when determining that $t1-t2>\Delta t1$, the transmission device may determine that the first video stream is earlier than the second video stream. When determining that $t2-t1>\Delta t1$, the transmission device may determine that the first video stream is later than the second video stream. When determining that $|t1-t2|<\Delta t2$, the transmission device may determine that the first video stream is synchronized with the second video stream. Herein, t1 is a timestamp of a first reference end-of-frame packet, t2 is a timestamp of a second reference end-of-frame packet, $\Delta t1$ is a preset first time difference threshold, $\Delta t2$ is a preset second time difference threshold, both $\Delta t1$ and $\Delta t2$ are values greater than 0 and less than T, and $\Delta t2$ may be the same as $\Delta t1$ or may be less than $\Delta t1$. $\Delta t1$ and $\Delta t2$ may be preset according to the following conditions: $T/2<\Delta t1<T$, and $0<\Delta t2<T/2$. For example, $\Delta t1$ may be $3\times T/4$, and $\Delta t2$ may be $T/4$. T is duration of a single video frame.

In this implementation, the determined synchronization relationship excludes impact of a precision deviation of device synchronization, a jitter of packet forwarding, and the like, and can better reflect a real synchronization status of video streams. The determined switching reference information of the first switching packet and the determined switching reference information of the second switching packet also better conform to the real synchronization status of the video streams. In this way, damage caused by a switch operation to a transmitted video picture can be further alleviated.

According to a second aspect, a transmission device is provided. The transmission device includes a processing unit and a communications unit.

The communications unit is configured to receive a plurality of video streams of a first video and a plurality of video streams of a second video, send the plurality of video streams of the first video through target output ports respectively corresponding to the plurality of video streams of the first video, and receive a switching instruction used to instruct to switch from the video streams of the first video to the video streams of the second video, where the plurality of video streams of the first video are used to encapsulate different sub-images of a video frame of the first video, and the plurality of video streams of the second video are used to encapsulate different sub-images of a video frame of the second video.

The processing unit is configured to, after the communications unit receives the switching instruction, determine switching reference information of a reference end-of-frame packet of each video stream of the first video, and determine switching reference information of a switching packet of the video stream based on the switching reference information of the reference end-of-frame packet of the video stream, and determine switching reference information of a reference end-of-frame packet of each video stream of the second video, and determine switching reference information of a switching packet of the video stream based on the switching reference information of the reference end-of-frame packet of the video stream, where reference end-of-frame packets of all video streams of the first video are used to encapsulate data of a same video frame of the first video, and reference end-of-frame packets of all video streams of the second video are used to encapsulate data of a same video frame of the second video.

The communications unit is further configured to switch, to the plurality of video streams of the second video based on the switching reference information of the switching packet of each video stream, from the plurality of video streams of the first video that are sent through the target output ports respectively corresponding to the plurality of video streams of the first video.

The switching reference information of the reference end-of-frame packet and the switching reference information of the switching packet that are of each video stream of the first video and the second video each may be a sequence number or a timestamp, or each may include both a sequence number and a timestamp.

In an implementation of the second aspect, a sequence number of a switching packet of each video stream of a to-be-switched-away video (namely, the first video) and a to-be-switched-to video (namely, the second video) is determined based on sequence numbers of end-of-frame packets of the to-be-switched-away video that correspond to a same video frame and sequence numbers of end-of-frame packets of the to-be-switched-to video that correspond to a same video frame, and video stream switching is performed based on the sequence number of the switching packet. During video stream switching, a location of a data packet sent before the switching and a location of a data packet sent after the switching are considered. Therefore, damage caused by a switch operation to a transmitted video picture can be effectively alleviated.

In a first implementation of the second aspect, the switching reference information of the reference end-of-frame packet of each video stream of the first video is determined based on a synchronization relationship among all the video streams of the first video, and the switching reference information of the reference end-of-frame packet of each video stream of the second video is determined based on a synchronization relationship among all the video streams of the second video.

In this implementation, because a synchronization relationship among all video streams of each video is considered, switching reference information (such as sequence numbers) of reference end-of-frame packets of each video stream that belong to a same video frame can be accurately determined.

Based on the second aspect or the first implementation of the second aspect, in a second implementation of the second aspect, for any video (which is referred to as a target video below) in the first video and the second video, the processing unit determines switching reference information of a reference end-of-frame packet of each video stream of the target video in the following manner.

Switching reference information of a reference end-of-frame packet of a reference video stream of the target video is determined based on a synchronization reference packet of the target video, where the reference video stream is one of a plurality of video streams of the target video, the synchronization reference packet is the $x^{th}$-to-last end-of-frame packet that is of the reference video stream and that is received before the switching reference information of the reference end-of-frame packet of each video stream of the target video is determined, and x is a natural number and may be 1.

For each video stream other than the reference video stream in the plurality of video streams of the target video, switching reference information of a reference end-of-frame packet of the other video stream is determined based on switching reference information of the $x^{th}$-to-last end-of-frame packet that is of the other video stream and that is received before the switching reference information of the reference end-of-frame packet of the other video stream is determined, and a synchronization relationship between the other video stream and the reference video stream.

In this implementation, for any video (namely, the target video) in the first video and the second video, switching reference information of reference end-of-frame packets of all video streams is determined based on switching reference information of the $x^{th}$-to-last end-of-frame packets of the video streams, and determined timestamps of the reference end-of-frame packets of the video streams are relatively close to each other. Therefore, switching packets with relatively consistent timestamps can be more accurately determined, so that damage caused by a switch operation to a transmitted video picture is further alleviated.

Based on the second implementation of the second aspect, in a third implementation of the second aspect, the processing unit may determine the synchronization relationship between the other video stream and the reference video stream based on a timestamp of the synchronization reference packet and a timestamp of the $x^{th}$-to-last end-of-frame packet that is of the other video stream and that is received before a sequence number of the reference end-of-frame packet of the other video stream is determined.

In this implementation, because the synchronization relationship is determined based on the timestamps of the $x^{th}$-to-last end-of-frame packets of the reference video stream and the other video stream, the synchronization relationship may reflect a synchronization status existing when the transmission device receives the $x^{th}$-to-last endof-frame packets of the reference video stream and the other video stream. Therefore, the switching reference information of the reference end-of-frame packet of the reference video stream and the switching reference information of the reference end-of-frame packet of the other video stream that are determined in consideration of both the synchronization relationship and the switching reference information of the $x^{th}$-to-last end-of-frame packets of the reference video stream and the other video stream better conform to a real synchronization status of video streams of the target video. Therefore, switching packets with relatively consistent timestamps can be more accurately determined, so that damage caused by a switch operation to a transmitted video picture can be further alleviated.

Based on the second or the third implementation of the second aspect, in a fourth implementation of the second aspect, x may be 1, and for each video stream of the first video and the second video, a video frame to which video data in a switching packet of the video stream belongs may be a next video frame or a subsequent video frame of the next video frame of a video frame to which video data in the reference end-of-frame packet of the video stream belongs. In a specific implementation, the switching reference information of the reference end-of-frame packet and the switching reference information of the switching packet that are of each video stream of the first video and the second video each include a sequence number. Correspondingly, a sequence number of the switching packet of the video stream may be calculated based on a sequence number of the reference end-of-frame packet of the video stream and a quantity of packets for encapsulating a single sub-image of the video stream, and a difference between the determined sequence number of the switching packet of the video stream and the sequence number of the reference end-of-frame packet of the video stream may be greater than or equal to the quantity of packets for encapsulating the single sub-image of the video stream. In another specific implementation, the switching reference information of the reference end-of-frame packet and the switching reference information of the switching packet that are of each video stream of the first video and the second video each include a timestamp. Correspondingly, a timestamp of the switching packet of the video stream may be calculated based on a timestamp of the reference end-of-frame packet of the video stream and duration of a single video frame of a video to which the video stream belongs, and a difference between the determined timestamp of the switching packet of the video stream and the timestamp of the reference end-of-frame packet of the video stream may be greater than or equal to the duration of the single video frame of the video.

Video stream switching may be performed at a location later than the reference end-of-frame packet by at least one frame in this implementation. This can effectively avoid damage to a video picture that is currently being transmitted.

Based on any one of the second aspect or the first to the fourth implementations of the second aspect, in a fifth implementation of the second aspect, for a first video stream of the first video and a second video stream of the second video, the processing unit determines switching reference information of a switching packet of the first video stream and switching reference information of a switching packet of the second video stream in the following manner, where the first video stream is any one of the plurality of video streams of the first video, and the second video stream is a video stream that corresponds to the first video stream and that is in the plurality of video streams of the second video.

The processing unit determines switching reference information of an alignment end-of-frame packet of the first video stream based on switching reference information of a reference end-of-frame packet of the first video stream and a synchronization relationship between the first video stream and the second video stream, and determines the switching reference information of the switching packet of the first video stream based on the switching reference information of the alignment end-of-frame packet of the first video stream, and determines switching reference information of an alignment end-of-frame packet of the second video stream based on switching reference information of a reference end-of-frame packet of the second video stream and the synchronization relationship, and determines the switching reference information of the switching packet of the second video stream based on the switching reference information of the alignment end-of-frame packet of the second video stream. The alignment end-of-frame packet of the first video stream corresponds to the alignment end-of-frame packet of the second video stream in terms of time.

The switching reference information of the reference end-of-frame packet, the switching reference information of the switching packet, and the switching reference information of the alignment end-of-frame packet that are of each video stream of the first video and the second video each may be a sequence number or a timestamp, or each may include both a sequence number and a timestamp.

In this implementation, the alignment end-of-frame packet of the first video stream and the alignment end-of-frame packet of the second video stream that are determined when the synchronization relationship is considered correspond to each other in terms of time. Therefore, a first switching packet and a second switching packet that are respectively determined based on the alignment end-of-frame packet of the first video stream and the alignment end-of-frame packet of the second video stream also correspond to each other in terms of time. In this way, damage caused by a switch operation to a transmitted video picture can be further alleviated.

Based on the fifth implementation of the second aspect, in a sixth implementation of the second aspect, the processing unit may directly use the switching reference information of the alignment end-of-frame packet of the first video stream as the switching reference information of the switching packet of the first video stream, and use the switching reference information of the alignment end-of-frame packet of the second video stream as the switching reference information of the switching packet of the second video stream. In other words, the alignment end-of-frame packet of the first video stream is directly used as the switching packet of the first video stream, and the alignment end-of-frame packet of the second video stream is directly used as the switching packet of the second video stream.

In this implementation, video stream switching may be performed at a video frame boundary. This can effectively avoid damage caused by a switch operation to a transmitted video picture.

Based on the fifth implementation of the second aspect, in a seventh implementation of the second aspect, the processing unit may determine, as the switching reference information of the switching packet of the first video stream, switching reference information of a data packet used to encapsulate blanking interval data of a sub-image next to, in time order, a sub-image to which video data in the alignment end-of-frame packet of the first video stream belongs, and determine, as the switching reference information of the switching packet of the second video stream, switching reference information of a data packet used to encapsulate blanking interval data of a sub-image next to, in time order, a sub-image to which video data in the alignment end-of-frame packet of the second video stream belongs.

In this implementation, video stream switching may be performed at a data packet used to encapsulate blanking interval data. Because the blanking interval data is not valid video data and is invisible to human eyes, damage to valid video data can be avoided.

According to a third aspect, a video stream switching system is provided. The system includes a controller and a transmission device. The controller is configured to send a switching instruction to the transmission device. The transmission device is configured to perform the method according to any one of the first aspect or the implementations of the first aspect, and may be the transmission device according to any one of the second aspect or the implementations of the second aspect.

According to a fourth aspect, a computer-readable storage medium is provided. The computer-readable storage medium stores an instruction. When the instruction is run on a computer, the computer is enabled to perform the method according to any one of the first aspect or the implementations of the first aspect.

According to a fifth aspect, a computer program product including an instruction is provided. When the computer program product is run on a computer, the computer is enabled to perform the method according to any one of the first aspect or the implementations of the first aspect.

BRIEF DESCRIPTION OF DRAWINGS

To describe the technical solutions in some of the embodiments of the present disclosure more clearly, the following briefly describes the accompanying drawings used for the embodiments.

FIG. 2A and FIG. 2B are schematic diagrams of ultra-high-definition picture division according to an embodiment of the present disclosure;

FIG. 6 is a schematic diagram of an update process of a switching child table and a switching summary table according to an embodiment of the present disclosure;

DESCRIPTION OF EMBODIMENTS

The following describes the embodiments of the present disclosure with reference to accompanying drawings.

Figure 1:
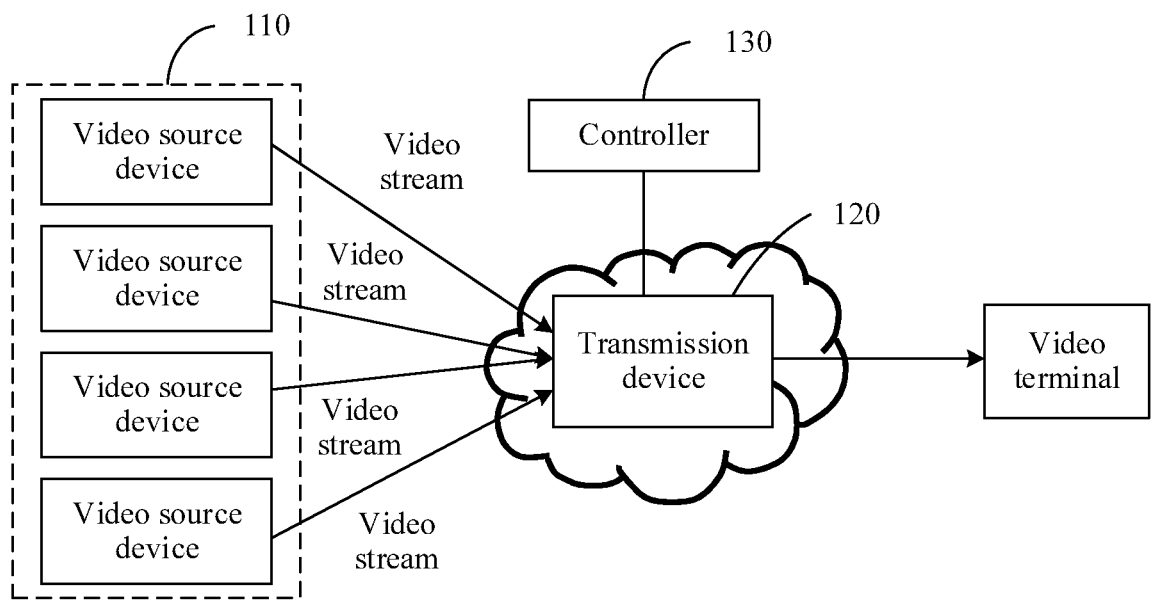
FIG. 1 is a schematic diagram of a networking structure of a multimedia communications system according to an embodiment of the present disclosure.

FIG. 1 is a schematic diagram of a networking structure of a multimedia communications system 100 according to an embodiment of the present disclosure. The multimedia communications system 100 includes a video source device 110 and a transmission device 120. The video source device 110 sends a video stream to a video terminal through the transmission device 120. The transmission device 120 may receive video streams from a plurality of video source devices 110, forward a video stream from only one of the video source devices to the video terminal, and further switch the forwarded video stream. The transmission device 120 may be a switch, a router, or the like. The video source device may be an IP camera, a device that performs IP encapsulation and transmission on video data, or the like. The multimedia communications system 100 may be a TV production and broadcasting system, such as a system that has a clean switching requirement for a video stream carried in an IP network, for example, a master control system of a production and broadcasting network of a TV station, a studio system, or a broadcasting system.

As shown in FIG. 1, the multimedia communications system 100 may further include a controller 130. The controller 130 is configured to send, to the transmission device 120, a switching instruction used to instruct the transmission device 120 to switch between video streams. Correspondingly, the transmission device 120 switches between the video streams after receiving the switching instruction.

The video source device 110 usually divides an ultra-high-definition video into a plurality of high-definition videos, and encapsulates the high-definition videos into a plurality of video streams for transmission. For example, a 4K video may be divided into four high-definition SDI signals, and then the high-definition SDI signals are transmitted in an SDI over IP (SDI over IP) manner.

A video frame of an ultra-high-definition video is usually divided into sub-images in the following two manners.

Figure 2A:
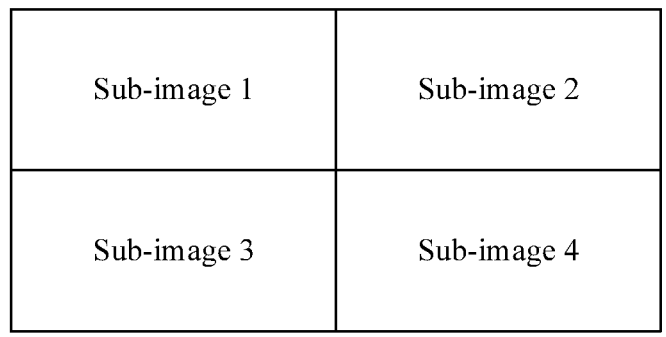

One manner is square division (SQD). To be specific, a video frame is equally divided into four sub-images: an upper left image, a lower left image, an upper right image, and a lower right image, as shown in FIG. 2A.

The other manner is 2 sample interleave (2SI). To be specific, two adjacent pixels in a same row are used as one pixel group, the top of a picture is a $0^{th}$ row, pixel groups in an even row are alternately numbered 1 and 2, pixel groups in an odd row are alternately numbered 3 and 4, and pixel groups with a same number form one sub-image. As shown in FIG. 2B, pixel groups numbered 1 form a sub-image 1, pixel groups numbered 2 form a sub-image 2, pixel groups numbered 3 form a sub-image 3, and pixel groups numbered 4 form a sub-image 4.

In the embodiments of the present disclosure, each sub-image of a video is encapsulated in a plurality of data packets for transmission. In the following description, the last data packet in the plurality of data packets in which each sub-image is encapsulated is referred to as an end-of-frame packet. The data packet in the embodiments of the present disclosure carries a sequence number and/or a timestamp, and information used to determine whether the data packet is an end-of-frame packet, and may be a Real-Time Transport Protocol (RTP) packet, a proprietary protocol-based packet, or the like. The RTP packet is used as an example. According to an RTP packet header format stipulated by Request for Comments (RFC) 3550, a value of an M (marker) field in an RTP packet header is used to indicate whether the RTP packet is an end-of-frame packet. If the value of M is 1, it indicates that the RTP packet is an end-of-frame packet. If the value of M is 0, it indicates that the RTP packet is not an end-of-frame packet. According to the Society of Motion Picture and Television Engineers (SMPTE) 2022 standard and the SMPTE 2110 standard, RTP is used to carry audio and video data in a production and broadcasting network. For example, according to the SMPTE 2022-6 standard, video data in an SDI format is encapsulated in an RTP packet and the RTP packet is transmitted through an IP-based network.

The video frame in the embodiments of the present disclosure is an uncompressed video frame, and may be a YUV video frame or a red, green, and blue (RGB) video frame. A quantity of packets used for a single sub-image of a same video stream (namely, a quantity of data packets required for encapsulating one sub-image of the video stream) is usually unchanged, may be up to several thousands, and may be represented as M below. M may be preset, or may be calculated based on a difference between sequence numbers of two adjacent end-of-frame packets of the received video stream. Video frames of a same video stream usually have same duration, which may be represented as T below. T may be preset, or may be calculated based on a difference between timestamps of two adjacent end-of-frame packets of the received video stream.

A switching packet in the embodiments of the present disclosure is a data packet at a switching location. Switching reference information of the switching packet is information that is in the switching packet and that is used for video stream switching, and may include at least one of a sequence number of the switching packet (the sequence number of the switching packet may be referred to as a switching sequence number) and a timestamp of the switching packet (the timestamp of the switching packet may be referred to as a switching timestamp). During video stream switching, switching is performed based on switching reference information of a switching packet of a video stream to be switched away (which is referred to as a to-be-switched-away stream) and switching reference information of a switching packet of a video stream to be switched to (which is referred to as a to-be-switched-to stream). For example, for the to-be-switched-away stream, a data packet whose sequence number is greater than a switching sequence number of the to-be-switched-away stream is no longer forwarded. For the to-be-switched-to stream, a data packet whose sequence number is greater than a switching sequence number of the to-be-switched-to stream starts to be forwarded.

Figure 3:
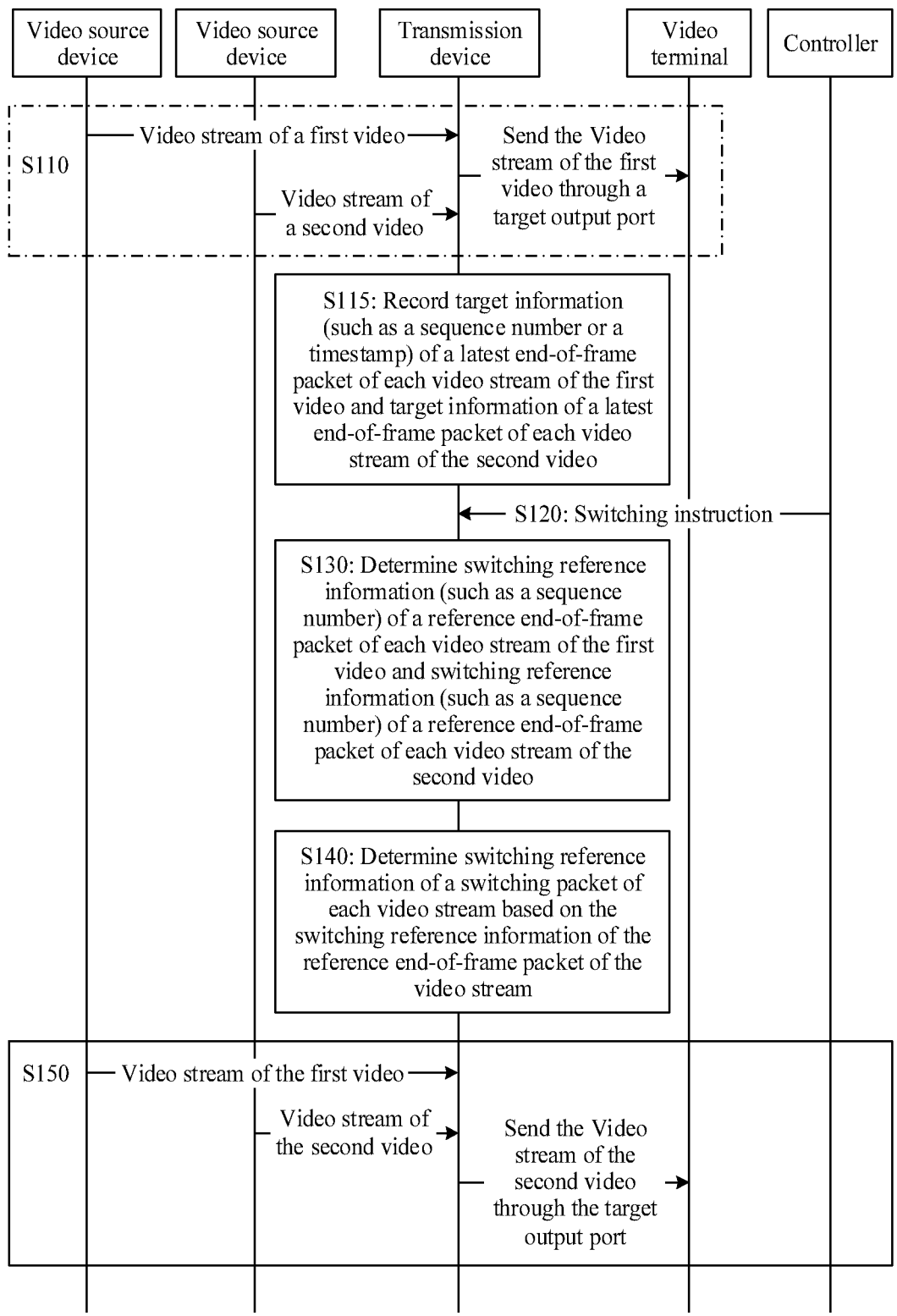
FIG. 3 is a schematic flowchart of a method according to an embodiment of the present disclosure.

The following describes a method 100 in Embodiment 1 of the present disclosure with reference to FIG. 3, FIG. 4A and FIG. 4B, FIG. 5A to FIG. 5C, and FIG. 6. FIG. 3 is a schematic flowchart of the method according to Embodiment 1 of the present disclosure. The method in Embodiment 1 of the present disclosure may be applied to the multimedia communications system 100 shown in FIG. 1, and is performed by a transmission device.

As shown in FIG. 3, the method 100 includes the following steps.

S110: The transmission device (such as the transmission device 120 shown in FIG. 1) receives a plurality of video streams of a first video and a plurality of video streams of a second video, and sends the plurality of video streams of the first video through target output ports respectively corresponding to the plurality of video streams of the first video.

The plurality of video streams of the first video are used to encapsulate different sub-images of a video frame of the first video, and the plurality of video streams of the second video are used to encapsulate different sub-images of a video frame of the second video. The plurality of video streams of the first video one-to-one correspond to the plurality of video streams of the second video. Sub-images encapsulated in video streams that have a correspondence may be sub-images at a same location, or may be sub-images at different locations. For example, the first video and the second video each are encapsulated into four video streams for sending. The four video streams of the first video are referred to as a stream 11, a stream 12, a stream 13, and a stream 14, which are respectively used to encapsulate an upper left sub-image, a lower left sub-image, an upper right sub-image, and a lower right sub-image. The four video streams of the second video are referred to as a stream 21, a stream 22, a stream 23, and a stream 24, which are respectively used to encapsulate an upper left sub-image, a lower left sub-image, an upper right sub-image, and a lower right sub-image. A correspondence may be that the stream 11 corresponds to the stream 21, the stream 12 corresponds to the stream 22, the stream 13 corresponds to the stream 23, and the stream 14 corresponds to the stream 24, or may be that the stream 11 corresponds to the stream 22, the stream 12 corresponds to the stream 21, the stream 13 corresponds to the stream 24, and the stream 14 corresponds to the stream 23. For ease of description, video streams that have a correspondence are referred to as a video stream pair below, a video stream that is of the first video and that is included in any video stream pair is referred to as a first video stream, and a video stream that is of the second video and that is included in the video stream pair is referred to as a second video stream. The first video stream is a to-be-switched-away stream, and the second video stream is a to-be-switched-to stream. For example, if the stream 11 corresponds to the stream 21, the stream 11 and the stream 21 are referred to as a video stream pair, the stream 11 is a to-be-switched-away stream, and the stream 21 is a to-be-switched-to stream.

The target output ports respectively corresponding to the plurality of video streams of the first video may be the same or may be different. For example, the stream 11 to the stream 14 are respectively sent through a target output port 1 to a target output port 4. For another example, the stream 11 to the stream 14 are all sent through a target output port 1. Target output ports corresponding to a to-be-switched-to stream and a to-be-switched-away stream in any video stream pair are the same. For example, the stream 11 and the stream 21 are a video stream pair and both correspond to a target output port 1.

In step S110, for each video stream pair of the first video and the second video, the transmission device forwards a received data packet of a first video stream through a target output port corresponding to the video stream pair, but does not forward a received data packet of a second video stream through the target output port corresponding to the video stream pair.

The transmission device may receive video streams of a plurality of videos, send a video stream of one of the plurality of videos through a target output port, and switch, among the video streams of the plurality of videos, the video stream sent through the target output port. The first video is a video to which a video stream that is being sent through the target output port when step S110 is performed belongs, and the second video is another video in the plurality of videos.

S120: The transmission device receives a switching instruction used to instruct to switch from the video streams of the first video to the video streams of the second video.

Further, the transmission device may receive the switching instruction from a controller (such as the controller 130 shown in FIG. 1).

In an implementation, the switching instruction may include an identifier of the first video and an identifier of the second video, and is used to instruct to switch from the video streams of the first video to the video streams of the second video. Correspondingly, the transmission device may determine identifiers of the plurality of video streams of the first video based on the identifier of the first video and a prestored correspondence between the identifier of the first video and the identifiers of the plurality of video streams of the first video, determine identifiers of the plurality of video streams of the second video based on the identifier of the second video and a prestored correspondence between the identifier of the second video and the identifiers of the plurality of video streams of the second video, determine, based on a prestored one-to-one correspondence between the identifiers of the video streams of the first video and the identifiers of the video streams of the second video, video streams that have a correspondence, and determine a port number of a target output port corresponding to the video streams (that is, a video stream pair) that have the one-to-one correspondence.

In another implementation, the switching instruction includes a plurality of instructions. Each instruction includes an identifier of a to-be-switched-away stream (for example, a multicast address of the to-be-switched-away stream) and an identifier of a to-be-switched-to stream (for example, a multicast address of the to-be-switched-to stream) that are in one video stream pair, and a target output port corresponding to the video stream pair, and is used to instruct to switch from the to-be-switched-away stream sent through the target output port to the to-be-switched-to stream.

The plurality of instructions may be sent through a same notification packet, or each instruction may be sent through a different notification packet.

S130: The transmission device determines switching reference information of a reference end-of-frame packet of each video stream of the first video and switching reference information of a reference end-of-frame packet of each video stream of the second video. Reference end-of-frame packets of all video streams of the first video are used to encapsulate data of a same video frame of the first video, and reference end-of-frame packets of all video streams of the second video are used to encapsulate data of a same video frame of the second video.

Switching reference information of each data packet (for example, a reference end-of-frame packet or a switching packet of each video stream) in this embodiment of the present disclosure may be a sequence number or a timestamp, or may include both a sequence number and a timestamp.

For each of the first video and the second video, switching reference information of a reference end-of-frame packet of each video stream of the video may be determined based on a synchronization relationship among all video streams of the video. Further, the $x^{th}$-to-last end-of-frame packet that is of one video stream (which is referred to as a reference video stream below) of the video and that is received before step S130 is performed may be used as a synchronization reference packet of the video. Switching reference information of a reference end-of-frame packet of the reference video stream is determined based on switching reference information of the synchronization reference packet. In addition, for each video stream other than the reference video stream in the plurality of video streams of the video, switching reference information of a reference end-of-frame packet of another video stream is determined based on switching reference information of the $x^{th}$-to-last end-of-frame packet that is of the other video stream and that is received before step S130 is performed, and a synchronization relationship between the other video stream and the reference video stream. Herein, x is a natural number and may be set to 1. When x is 1, the synchronization reference packet is the last end-of-frame packet that is of the reference video stream and that is received before step S130 is performed. When x is 1, an end-of-frame packet that has a largest timestamp in the last end-of-frame packets of all the video streams of the video and that is received before step S130 is performed may be used as the synchronization reference packet. In this case, it may be considered that the video stream (namely, the reference video stream) to which the synchronization reference packet belongs is a video stream that first arrives at the transmission device in all the video streams of the video.

After receiving the switching instruction, the transmission device may perform step S130 when receiving at least one end-of-frame packet of each video stream of the first video and at least one end-of-frame packet of each video stream of the second video. After receiving the switching instruction, if the transmission device needs to calculate, based on sequence numbers of adjacent end-of-frame packets of each video stream, a quantity of packets used for a single sub-image of the video stream, the transmission device may alternatively perform step S130 when receiving at least two end-of-frame packets of each video stream.

The transmission device may alternatively perform step S130 immediately after receiving the switching instruction. In other words, an execution time of step S120 is very close to that of step S130. In this case, the $x^{th}$-to-last end-of-frame packet that is of each video stream and that is received before step S130 is performed is the $x^{th}$-to-last end-of-frame packet that is of the video stream and that is received before the switching instruction is received.

Figure 4A:
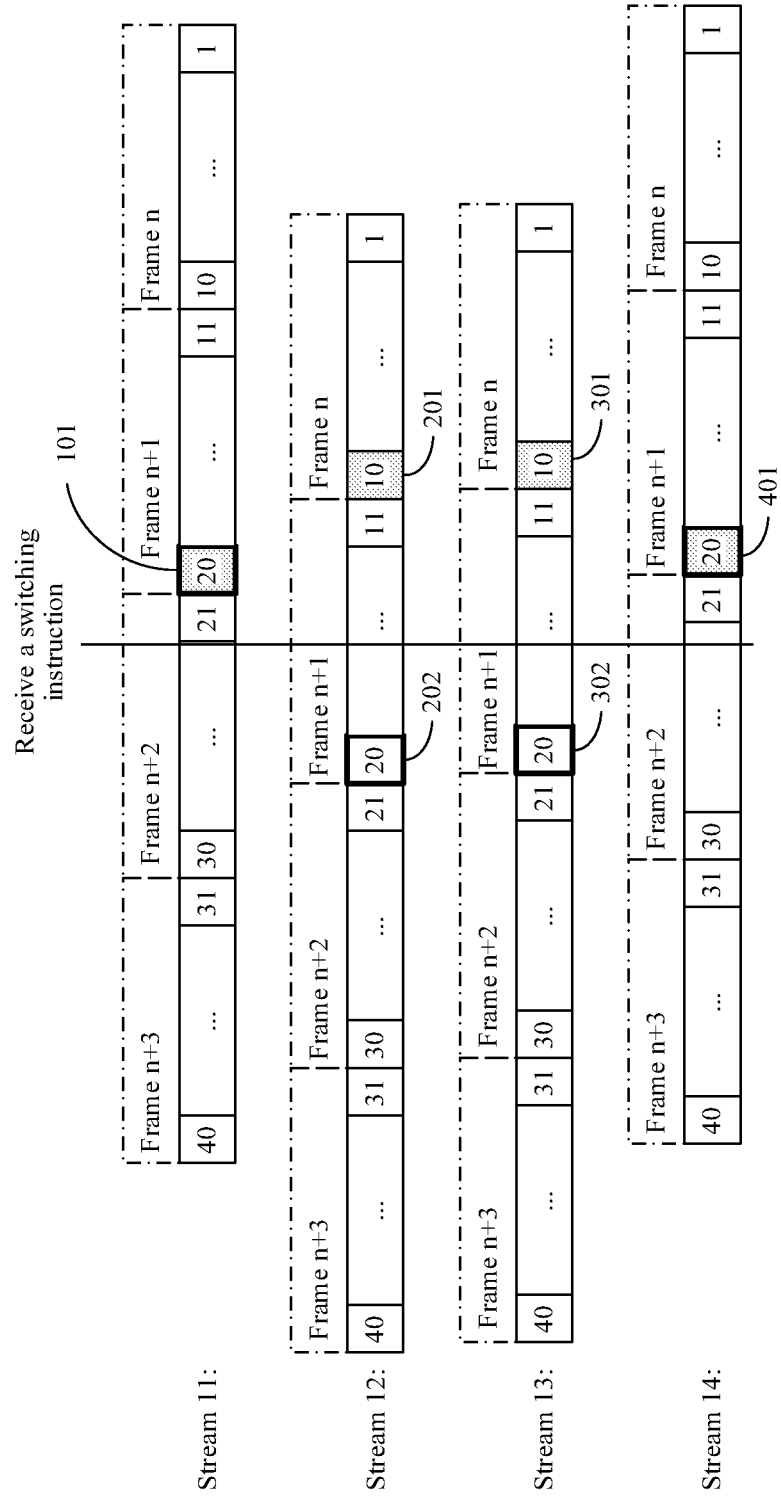
FIG. 4A and FIG. 4B and FIG. 5A, FIG. 5B, and FIG. 5C are schematic diagrams of video streams according to an embodiment of the present disclosure.

As shown in FIG. 4A, step S130 is performed immediately after the switching instruction is received. If x is 1, an end-of-frame packet 101 of the stream 11 may be used as a synchronization reference packet, and a sequence number is 20. The last end-of-frame packets that are of the stream 12, the stream 13, and the stream 14 and that are received before step S130 is performed are an end-of-frame packet 201, an end-of-frame packet 301, and an end-of-frame packet 401.

For each of the first video and the second video, after the switching reference information (such as a sequence number) of the synchronization reference packet of the video is determined, the switching reference information of the synchronization reference packet may be used as the switching reference information of the reference end-of-frame packet of the reference video stream. In other words, the reference end-of-frame packet of the reference video stream is the synchronization reference packet. In addition, the switching reference information of the reference end-of-frame packet of the other video stream of the video is determined in the following manner.

For each video stream other than the reference video stream in all the video streams of the video, when it is determined that the other video stream is synchronized with the reference video stream, switching reference information of the $x^{th}$-to-last end-of-frame packet that is of the other video stream and that is received before step S130 is performed is determined as the switching reference information of the reference end-of-frame packet of the other video stream, or when it is determined that the other video stream is later than the reference video stream, switching reference information of a next end-of-frame packet of the $x^{th}$-to-last end-of-frame packet that is of the other video stream and that is received before step S130 is performed is determined as the switching reference information of the reference end-of-frame packet of the other video stream, or when it is determined that the other video stream is earlier than the reference video stream, switching reference information of a previous end-of-frame packet of the $x^{th}$-to-last end-of-frame packet that is of the other video stream and that is received before step S130 is performed is determined as the switching reference information of the reference end-of-frame packet of the other video stream.

Further, the switching reference information of the reference end-of-frame packet of each video stream of the video may be determined in one or a combination of the following two implementations (an implementation M and an implementation N).

Implementation M: The switching reference information of the synchronization reference packet and the switching reference information of the reference end-of-frame packet of each video stream of the video each include a sequence number.

A sequence number of the synchronization reference packet is used as a sequence number of the reference end-of-frame packet of the reference video stream.

For each video stream other than the reference video stream in all the video streams of the video, a quantity of data packets required for encapsulating one video sub-image of the other video stream is represented as M, a sequence number of the $x^{th}$-to-last end-of-frame packet that is of the other video stream and that is received before step S130 is performed is represented as Sx, and a sequence number of the reference end-of-frame packet of the other video stream is represented as Sy. When it is determined that the other video stream is synchronized with the reference video stream, Sx is used as Sy. Alternatively, when it is determined that the other video stream is later than the reference video stream, Sy is determined according to Sy=Sx+M. Alternatively, when it is determined that the other video stream is earlier than the reference video stream, Sy is determined according to Sy=Sx−M.

Figure 4B:
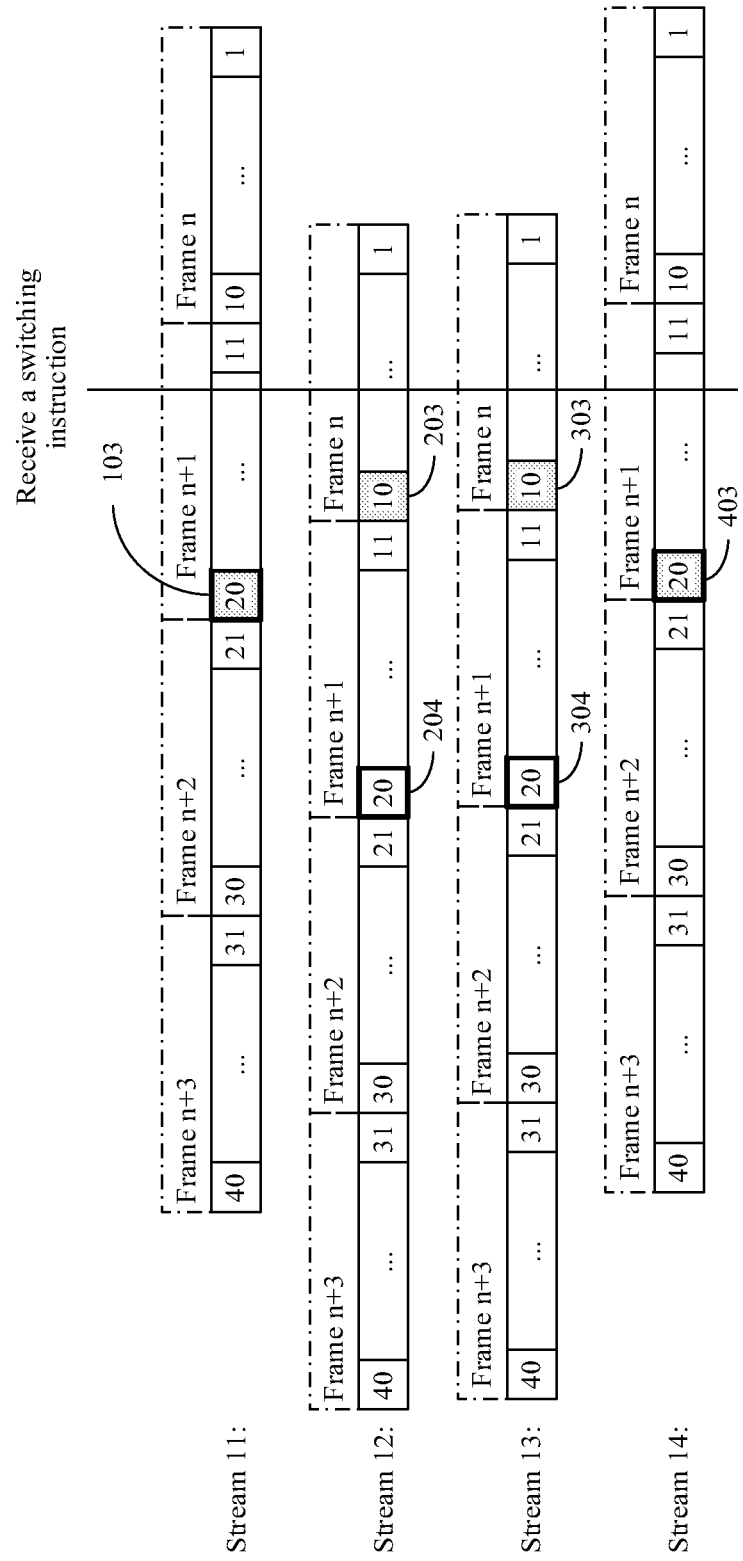

FIG. 4A and FIG. 4B show examples of the video streams of the first video. In the examples shown in FIG. 4A and FIG. 4B, it is assumed that M is 10.

In the example shown in FIG. 4A, step S130 is performed immediately after the switching instruction is received. As shown in FIG. 4A, a value of x is 1, and the last end-of-frame packet, namely, the end-of-frame packet 101 of the stream 11, received before the switching instruction is received is used as the synchronization reference packet. The stream 11 is the reference video stream, and a sequence number 20 of the synchronization reference packet (namely, the end-of-frame packet 101) is used as a sequence number of a reference end-of-frame packet of the stream 11. In this case, the reference end-of-frame packet of the stream 11 is the end-of-frame packet 101. The stream 12 is later than the stream 11, and a sum 20 of M (namely, 10) and a sequence number 10 of the last end-of-frame packet 201 that is of the stream 12 and that is received before the switching instruction is received is determined as a sequence number of a reference end-of-frame packet of the stream 12. In this case, the reference end-of-frame packet of the stream 12 is an end-of-frame packet 202. The stream 13 is later than the stream 11, and a sum 20 of M (namely, 10) and a sequence number 10 of the last end-of-frame packet 301 that is of the stream 13 and that is received before the switching instruction is received is determined as a sequence number of a reference end-of-frame packet of the stream 13. In this case, the reference end-of-frame packet of the stream 13 is an end-of-frame packet 302. The stream 14 is synchronized with the stream 11, and a sequence number 20 of the last end-of-frame packet 401 that is of the stream 14 and that is received before the switching instruction is received is used as a sequence number of a reference end-of-frame packet of the stream 14. In this case, the reference end-of-frame packet of the stream 14 is the end-of-frame packet 401.

In the example shown in FIG. 4B, after the switching instruction is received, step S130 is performed when at least one end-of-frame packet of each video stream of the first video is received. As shown in FIG. 4B, a value of x is 1, and the last end-of-frame packet, namely, an end-of-frame packet 103 of the stream 11, received before step S130 is performed is used as the synchronization reference packet. The stream 11 is the reference video stream, and a sequence number 20 of the synchronization reference packet (namely, the end-of-frame packet 103) is used as a sequence number of a reference end-of-frame packet of the stream 11. In this case, the reference end-of-frame packet of the stream 11 is the end-of-frame packet 103. The stream 12 is later than the stream 11, and a sum 20 of M (namely, 10) and a sequence number 10 of the last end-of-frame packet 203 that is of the stream 12 and that is received before the switching instruction is received is determined as a sequence number of a reference end-of-frame packet of the stream 12. In this case, the reference end-of-frame packet of the stream 12 is an end-of-frame packet 204. The stream 13 is later than the stream 11, and a sum 20 of M (namely, 10) and a sequence number 10 of the last end-of-frame packet 303 that is of the stream 13 and that is received before the switching instruction is received is determined as a sequence number of a reference end-of-frame packet of the stream 13. In this case, the reference end-of-frame packet of the stream 13 is an end-of-frame packet 304. The stream 14 is synchronized with the stream 11, and a sequence number 20 of the last end-of-frame packet 403 that is of the stream 14 and that is received before the switching instruction is received is used as a sequence number of a reference end-of-frame packet of the stream 14. In this case, the reference end-of-frame packet of the stream 14 is the end-of-frame packet 403.

Implementation N: The switching reference information of the synchronization reference packet and the switching reference information of the reference end-of-frame packet of each video stream of the video each include a timestamp.

A timestamp of the synchronization reference packet is used as a timestamp of the reference end-of-frame packet of the reference video stream.

Duration of a single video frame of the video is represented as T. For each video stream other than the reference video stream in all the video streams of the video, a timestamp of the $x^{th}$-to-last end-of-frame packet that is of the other video stream and that is received before step S130 is performed is represented as Tx, and a timestamp of the reference end-of-frame packet of the other video stream is represented as Ty. When it is determined that the other video stream is synchronized with the reference video stream, Tx is used as Ty. Alternatively, when it is determined that the other video stream is later than the reference video stream, Ty is determined according to Ty=Tx+T. Alternatively, when it is determined that the other video stream is earlier than the reference video stream, Ty is determined according to Ty=Tx−T.

For each video stream other than the reference video stream in all the video streams of the video, the transmission device may determine the synchronization relationship between the other video stream and the reference video stream based on a timestamp Tq of the synchronization reference packet of the video and the timestamp Tx of the $x^{th}$-to-last end-of-frame packet that is of the other video stream and that is received before the sequence number of the reference end-of-frame packet of the other video stream is determined.

Device synchronization has a precision deviation. Therefore, timestamps of data packets sent from different video source devices at a same moment may have a deviation. In addition, data is transmitted in a form of a packet in an IP network, and a jitter of packet forwarding may cause some synchronization deviations. Therefore, if a timestamp deviation between two reference end-of-frame packets is less than a preset time difference threshold, it may be considered that two video streams are synchronous. The time difference threshold for determining synchronization may be determined based on clock synchronization precision of a video source device in the network.

Further, when determining that Tx−Tq>ΔT1, the transmission device may determine that the other video stream is earlier than the reference video stream. When determining that Tq−Tx>ΔT1, the transmission device may determine that the other video stream is later than the reference video stream. When determining that |Tx−Tq|<ΔT2, the transmission device may determine that the other video stream is synchronized with the reference video stream. Both ΔT1 and ΔT2 are preset time difference thresholds greater than 0 and less than T, and ΔT2 may be the same as ΔT1 or may be less than ΔT1. ΔT1 and ΔT2 may be preset according to the following conditions: T/2<ΔT1<T, and 0<ΔT2<T/2. For example, ΔT1 may be 3×T/4, and ΔT2 may be T/4. T is duration of a single video frame. In this embodiment of the present disclosure, T may be preset or may be obtained through calculation based on preset video information (for example, a frame rate). In addition, because duration of single video frames of videos to which video streams that have a mutual switching requirement belongs is usually the same, T may alternatively be obtained through calculation based on a received data packet of the other video stream or the reference video stream, for example, is obtained through calculation based on a difference between timestamps of two adjacent end-of-frame packets of the reference video stream.

S140: The transmission device determines switching reference information of a switching packet of each video stream based on the switching reference information of the reference end-of-frame packet of each video stream.

For each video stream of the first video and the second video, a video frame to which video data in the switching packet of the video stream belongs may be a next video frame or a subsequent video frame of the next video frame of a video frame to which video data in the reference end-of-frame packet of the video stream belongs. When a value of x is 1, video stream switching is performed at a location later than the reference end-of-frame packet by at least one frame in this implementation. This can effectively avoid damage to a video picture that is currently being transmitted.

In an implementation, the switching reference information of the reference end-of-frame packet and the switching reference information of the switching packet that are of each video stream of the first video and the second video each include a sequence number. Correspondingly, a switching sequence number of the video stream may be calculated based on a sequence number of the reference end-of-frame packet of the video stream and a quantity of packets for encapsulating a single sub-image of the video stream, and a difference between the determined switching sequence number of the video stream and the sequence number of the reference end-of-frame packet of the video stream may be greater than or equal to the quantity of packets for encapsulating the single sub-image of the video stream.

In another implementation, the switching reference information of the reference end-of-frame packet and the switching reference information of the switching packet that are of each video stream of the first video and the second video each include a timestamp. Correspondingly, a switching timestamp of the video stream may be calculated based on a timestamp of the reference end-of-frame packet of the video stream and duration of a single video frame of a video to which the video stream belongs, and a difference between the determined switching timestamp of the video stream and the timestamp of the reference end-of-frame packet of the video stream may be greater than or equal to the duration of the single video frame of the video.

In specific implementation, the transmission device may first determine switching reference information of an alignment end-of-frame packet of the video stream based on the switching reference information of the reference end-of-frame packet of the video stream, and then determine the switching reference information of the switching packet based on the switching reference information of the alignment end-of-frame packet. For example, the switching reference information of the alignment end-of-frame packet is used as the switching reference information of the switching packet. For another example, switching reference information of a data packet used to encapsulate blanking interval data of a sub-image next to, in time order, a sub-image to which video data in the alignment end-of-frame packet belongs is determined as the switching reference information of the switching packet, and the alignment end-of-frame packet is a subsequent end-of-frame packet of the reference end-of-frame packet. For each video stream pair, alignment end-of-frame packets of a to-be-switched-away stream and a to-be-switched-to stream in the video stream pair correspond to each other in terms of time. For ease of description, alignment end-of-frame packets of a to-be-switched-away stream and a to-be-switched-to stream in any video stream pair are referred to as a first alignment end-of-frame packet and a second alignment end-of-frame packet. That the first alignment end-of-frame packet and the second alignment end-of-frame packet correspond to each other in terms of time means that for the first alignment end-of-frame packet, the second alignment end-of-frame packet is an end-of-frame packet that is in all end-of-frame packets of the second video stream and whose timestamp is closest to that of the first alignment end-of-frame packet. It may be understood that, for a video frame corresponding to the first alignment end-of-frame packet, a video frame corresponding to the second alignment end-of-frame packet is a video frame that is in all video frames of the second video stream and that is closest, in terms of time, to the video frame corresponding to the first alignment end-of-frame packet.

Switching reference information of each of reference end-of-frame packets, alignment end-of-frame packets, and switching packets of all video streams of the first video and the second video may be a sequence number or a timestamp, or may include both a sequence number and a timestamp.

For each video stream pair, switching reference information of an alignment end-of-frame packet of each video stream in the video stream pair and switching reference information of a switching packet of the video stream may be determined in one or a combination of the following implementation A and implementation B. The implementation A is used to determine a sequence number of the switching packet, and the implementation B is used to determine a timestamp of the switching packet.

Implementation A:

As described above, for ease of description, video streams that have a correspondence are referred to as a video stream pair, a video stream that is of the first video and that is included in each video stream pair is referred to as a first video stream, and a video stream that is of the second video and that is included in the video stream pair is referred to as a second video stream.

In the implementation A, the transmission device may first calculate a sequence number of the first alignment end-of-frame packet based on a sequence number of a first reference end-of-frame packet and a quantity of packets used for a single sub-image of the first video stream, and then determine a sequence number of a first switching packet based on the sequence number of the first alignment end-of-frame packet. In addition, the transmission device may first calculate a sequence number of the second alignment end-of-frame packet based on a sequence number of a second reference end-of-frame packet of the second video stream and a quantity of packets used for a single sub-image of the second video stream, and then determine a sequence number of a second switching packet based on the sequence number of the second alignment end-of-frame packet.

Further, a sequence number of the alignment end-of-frame packet of each video stream in the first video stream and the second video stream may be determined in either of the following two implementations (an implementation A1 and an implementation A2) in the implementation A.

Implementation A1: Considering that the first video stream and the second video stream may be asynchronous, in the implementation A1, the transmission device first determines a synchronization relationship between the first video stream and the second video stream, and then calculates the sequence number of the alignment end-of-frame packet of each video stream in the first video stream and the second video stream based on the synchronization relationship and a sequence number of a reference end-of-frame packet of the video stream. The synchronization relationship between the first video stream and the second video stream may be that the first video stream is earlier than the second video stream, the first video stream is later than the second video stream, or the first video stream is synchronized with the second video stream. Out-of-synchronization between video streams that have a mutual switching requirement usually does not exceed one frame.

After the synchronization relationship between the first video stream and the second video stream is determined, the sequence number of the first alignment end-of-frame packet of the first video stream and the sequence number of the second alignment end-of-frame packet of the second video stream are determined in the following manner. For ease of description, in this embodiment of the present disclosure, the sequence number of the first reference end-of-frame packet is represented as S11, the sequence number of the first alignment end-of-frame packet is represented as S12, the sequence number of the second reference end-of-frame packet is represented as S21, the sequence number of the second alignment end-of-frame packet is represented as S22, the quantity of packets used for the single sub-image of the first video stream is represented as M1, and the quantity of packets used for the single sub-image of the second video stream is represented as M2. M1 and M2 may be the same or different, and M1 and M2 are usually the same. In the following example, it is assumed that both M1 and M2 are 10.

When the determined synchronization relationship between the first video stream and the second video stream is that the first video stream is earlier than the second video stream, the sequence number S12 of the first alignment end-of-frame packet is determined according to a formula S12=S11+m×M1, and the sequence number S22 of the second alignment end-of-frame packet is determined according to a formula S22=S21+(m+1)×M2. Herein, m is a natural number and may be set to 1.

Figure 5A:
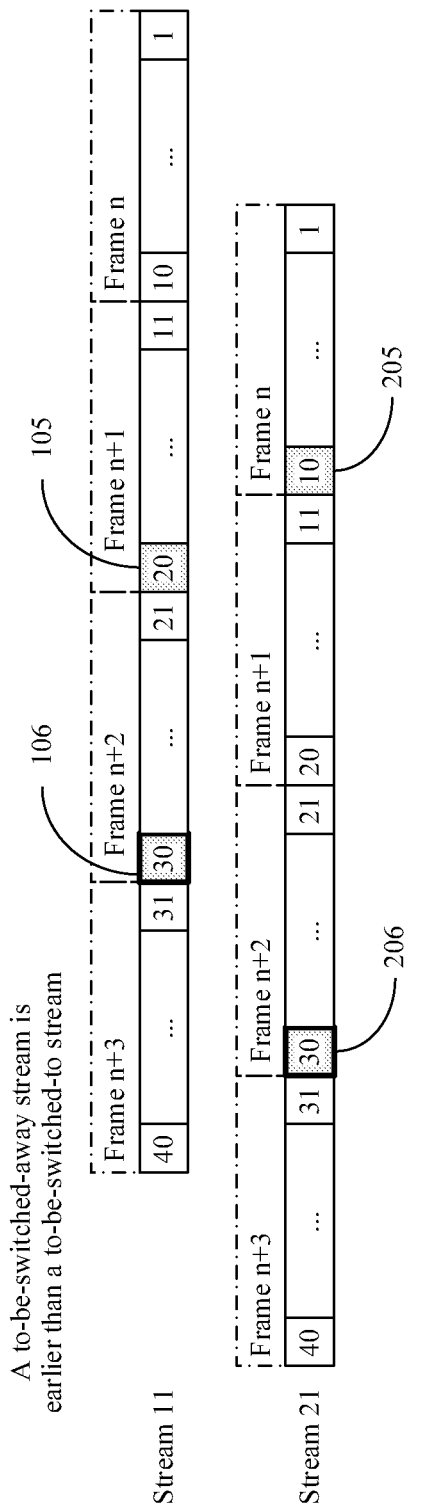

It is assumed that m is 1. As shown in FIG. 5A, the first reference end-of-frame packet is an end-of-frame packet 105, the sequence number of the first reference end-of-frame packet is 20, the sequence number of the first alignment end-of-frame packet 106 is 20+10=30, the second reference end-of-frame packet is an end-of-frame packet 205, the sequence number of the second reference end-of-frame packet is 10, and the sequence number of the second alignment end-of-frame packet 206 is 10+2×10=30.

When the determined synchronization relationship between the first video stream and the second video stream is that the first video stream is later than the second video stream, the sequence number S12 of the first alignment end-of-frame packet is determined according to a formula S12=S11+(n+1)×M1, and the sequence number S22 of the second alignment end-of-frame packet is determined according to a formula S22=S21+n×M2. Herein, n is a natural number and may be set to 1.

Figure 5B:
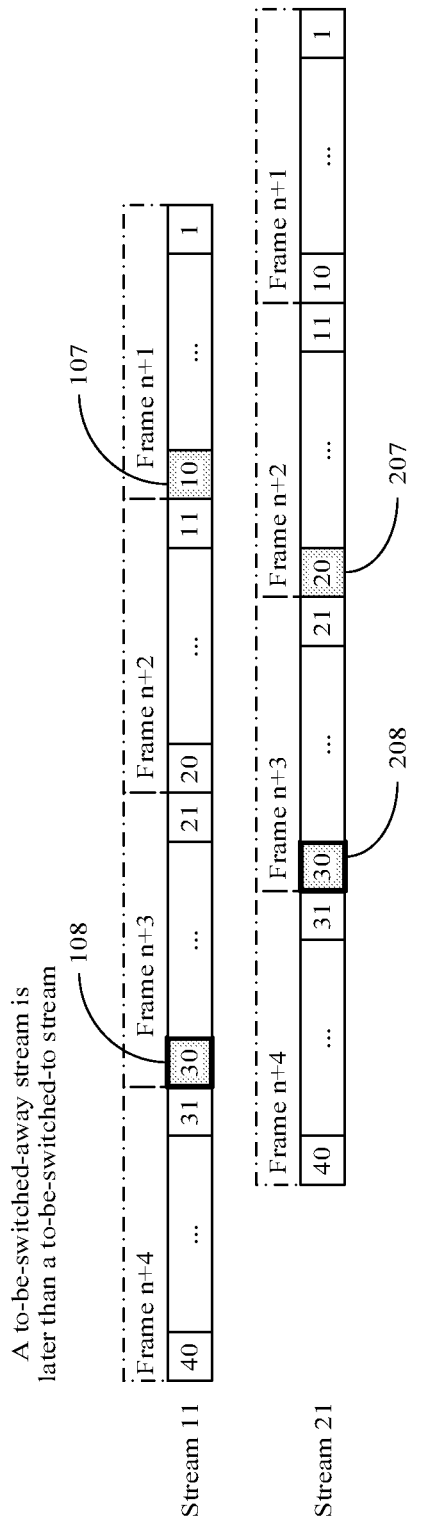

It is assumed that n is 1. As shown in FIG. 5B, the first reference end-of-frame packet is an end-of-frame packet 107, the sequence number of the first reference end-of-frame packet is 10, the sequence number of the first alignment end-of-frame packet 108 is 10+2×10=30, the second reference end-of-frame packet is an end-of-frame packet 207, the sequence number of the second reference end-of-frame packet is 20, and the sequence number of the second alignment end-of-frame packet 208 is 20+10=30.

When the determined synchronization relationship between the first video stream and the second video stream is that the first video stream is synchronized with the second video stream, the sequence number S12 of the first alignment end-of-frame packet is determined according to a formula S12=S11+k×M1, and the sequence number S22 of the second alignment end-of-frame packet is determined according to a formula S22=S21+k×M2. Herein, k is a natural number and may be set to 1.

Figure 5C:
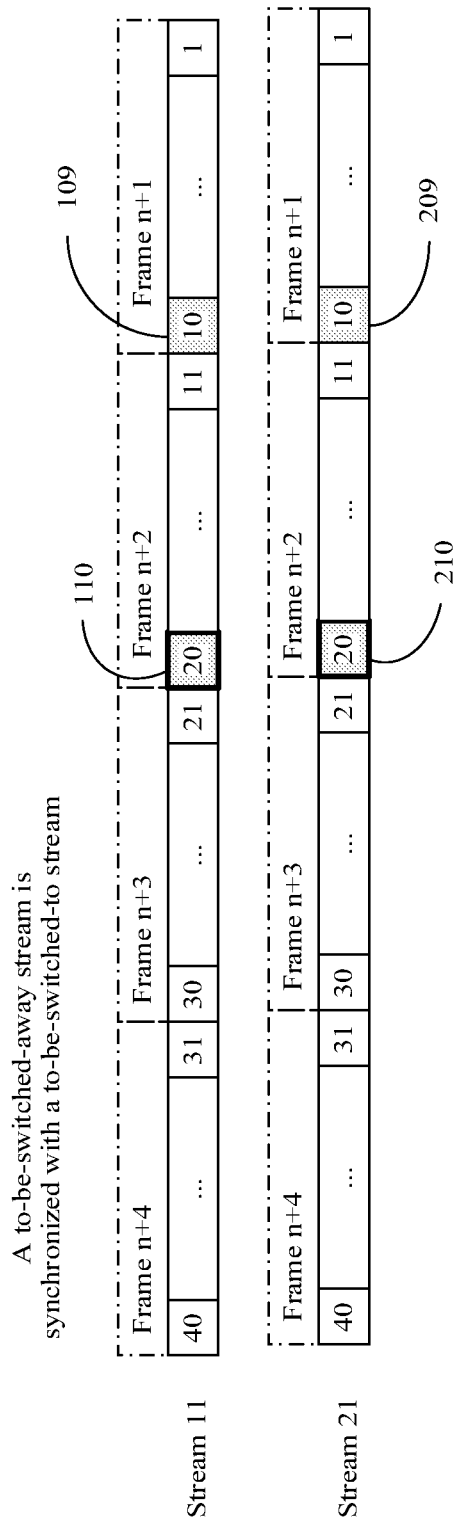

It is assumed that k is 1. As shown in FIG. 5C, the first reference end-of-frame packet is an end-of-frame packet 109, the sequence number of the first reference end-of-frame packet is 10, the sequence number of the first alignment end-of-frame packet 110 is 10+10=20, the second reference end-of-frame packet is an end-of-frame packet 209, the sequence number of the second reference end-of-frame packet is 10, and the sequence number of the second alignment end-of-frame packet 210 is 10+10=20.

Timestamps of end-of-frame packets (namely, the first alignment end-of-frame packet and the second alignment end-of-frame packet) corresponding to the sequence number of the first alignment end-of-frame packet and the sequence number of the second alignment end-of-frame packet that are determined in the implementation A1 are basically consistent, and timestamps that are of switching packets and that are determined based on this are also basically consistent. Therefore, it can be ensured that a to-be-switched-away stream and a to-be-switched-to stream are connected in a time dimension during switching, and a problem of frame redundancy or frame lack does not occur.

Implementation A2: In the implementation A2, a synchronization relationship between the first video stream and the second video stream is not considered, but it is assumed that the first video stream and the second video stream are synchronous. In this case, the sequence number S12 of the first alignment end-of-frame packet may be directly determined according to a formula S12=S11+k×M1, and the sequence number S22 of the second alignment end-of-frame packet may be directly determined according to a formula S22=S21+k×M2.

After the sequence number of the first alignment end-of-frame packet and the sequence number of the second alignment end-of-frame packet are determined, a sequence number (which is referred to as a first switching sequence number below) of a switching packet of the first video stream and a sequence number (which is referred to as a second switching sequence number below) of a switching packet of the second video stream are separately determined based on the sequence number of the first alignment end-of-frame packet and the sequence number of the second alignment end-of-frame packet in either of the following two implementations (an implementation X1 and an implementation X2).

Implementation X1: The implementation X1 is used to implement video stream switching at a frame boundary. In the implementation X1, the sequence number of the first alignment end-of-frame packet of the first video stream is used as the first switching sequence number, and the sequence number of the second alignment end-of-frame packet of the second video stream is used as the second switching sequence number.

As shown in FIG. 5A, the sequence number 30 of the first alignment end-of-frame packet 106 is used as the first switching sequence number, that is, the first alignment end-of-frame packet 106 is used as the switching packet of the first video stream, and the sequence number 30 of the second alignment end-of-frame packet 206 is used as the second switching sequence number, that is, the second alignment end-of-frame packet 206 is used as the switching packet of the second video stream.

Implementation X2: The implementation X2 is used to implement video stream switching at a blanking interval.

In a video field, in a scanning process in which an optical signal is converted into an electrical signal, scanning always starts from the upper left corner of an image, then a scanning point moves horizontally to the right, and at the same time, the scanning point moves downward at a relatively low speed. When the scanning point reaches the right edge of the image, the scanning point quickly returns to the left, and scanning of the second row starts at a location below a start point of the first row. A return process between rows is referred to as horizontal blanking. A signal obtained by scanning a complete image includes row signal sequences separated by a horizontal blanking interval, and the row signal sequences are referred to as one frame. After completing scanning a frame, the scanning point returns from the lower right corner of the image to the upper left corner of the image to start scanning of a new frame. Such a time interval is referred to as vertical blanking or field blanking. The horizontal blanking and the vertical blanking carry no visible content in an SDI signal, and are collectively referred to as a blanking interval. To guide switching between video streams in an SDI format, SMPTE RP-168 specifies a switching row or a switching area. Switching between two SDI signals in the switching row or switching area does not damage valid video data. In SMPTE 2022-6, an SDI signal is carried in an IP packet. Therefore, clean switching for a video stream encapsulated by using SMPTE 2022-6 should be performed at the blanking interval.

In conclusion, if both the first video stream and the second video stream are video streams coded by using SMPTE 2022-6, video stream switching may be performed at a data packet for encapsulating blanking interval data.

For the first video stream, a sequence number of a data packet used to encapsulate blanking interval data of a sub-image next to, in time order, a sub-image corresponding to the sequence number of the first alignment end-of-frame packet may be determined as the first switching sequence number. For example, a sum of the sequence number of the first alignment end-of-frame packet of the first video stream and ΔM1 is determined as the first switching sequence number, and ΔM1=⌊OL1×SL1/1376⌋+1 or ΔM1=⌈OL1×SL1/1376⌉. Herein, OL1 is a quantity of bytes occupied by each row of pixels in a single sub-image of the first video stream, and SL1 is a switching row number of the single sub-image of the first video stream.

For the second video stream, a sequence number of a data packet used to encapsulate blanking interval data of a sub-image next to, in time order, a sub-image corresponding to the sequence number of the second alignment end-of-frame packet is determined as the second switching sequence number. For example, a sum of the sequence number of the second alignment end-of-frame packet of the second video stream and ΔM2 is determined as the second switching sequence number, and ΔM2=⌊OL2×SL2/1376⌋+1 or ΔM2=⌈OL2×SL2/1376⌉. Herein, OL2 is a quantity of bytes occupied by each row of pixels in a single sub-image of the second video stream, and SL2 is a switching row number of the single sub-image of the second video stream.

The switching row number may depend on an SDI video standard. The SMPTE RP-168 specifies switching row numbers of video images in most video formats. A video format of each sub-image of the first video is usually the same as that of each sub-image of the second video. Therefore, the switching row number SL1 of the first video is usually the same as the switching row number SL2 of the second video.

For each of the first video and the second video, if a 4:2:2 sampling manner is used, a quantity of bytes occupied by each row of pixels in a single sub-image of a video stream of the video is OL=PL×BS×2/8. Herein, PL is a total quantity of pixels in each row of the single sub-image of the video stream of the video (where the quantity includes a quantity of row blanking pixels and a quantity of valid video pixels), and BS is a pixel bit depth. It may be understood that, if a pixel bit depth and a sampling manner of the first video are the same as those of the second video, OL1 and OL2 are usually the same.

Implementation B:

In the implementation B, the transmission device may first calculate a timestamp of the first alignment end-of-frame packet based on a timestamp of a first reference end-of-frame packet and duration of a single video frame of the first video stream, and then determine a timestamp of a first switching packet based on the timestamp of the first alignment end-of-frame packet. In addition, the transmission device may first calculate a timestamp of the second alignment end-of-frame packet based on a timestamp of a second reference end-of-frame packet of the second video stream and duration of a single video frame of the second video stream, and then determine a timestamp of a second switching packet based on the timestamp of the second alignment end-of-frame packet.

Further, a timestamp of the alignment end-of-frame packet of each video stream in the first video stream and the second video stream may be determined in either of the following two implementations (an implementation B1 and an implementation B2) in the implementation B.

Implementation B1: Considering that different video streams may be asynchronous, in the implementation B1, the transmission device first determines a synchronization relationship between the first video stream and the second video stream, and then calculates the timestamp of the alignment end-of-frame packet of each video stream in the first video stream and the second video stream based on the synchronization relationship and a timestamp of a reference end-of-frame packet of the video stream.

After the synchronization relationship between the first video stream and the second video stream is determined, the timestamp of the first alignment end-of-frame packet of the first video stream and the timestamp of the second alignment end-of-frame packet of the second video stream are determined in the following manner. For ease of description, in this embodiment of the present disclosure, the timestamp of the first reference end-of-frame packet is represented as t11, the timestamp of the first alignment end-of-frame packet is represented as t12, the timestamp of the second reference end-of-frame packet is represented as t21, the timestamp of the second alignment end-of-frame packet is represented as t22, the duration of the single video frame of the first video stream is represented as T1, and the duration of the single video frame of the second video stream is represented as T2. T1 and T2 may be the same or different, and T1 and T2 are usually the same.

When the determined synchronization relationship between the first video stream and the second video stream is that the first video stream is earlier than the second video stream, the timestamp t12 of the first alignment end-of-frame packet is determined according to a formula $t12=t11+m \times T1$, and the timestamp t22 of the second alignment end-of-frame packet is determined according to a formula $t22=t21+(m+1) \times T2$. Herein, m is a natural number and may be set to 1.

When the determined synchronization relationship between the first video stream and the second video stream is that the first video stream is later than the second video stream, the timestamp t12 of the first alignment end-of-frame packet is determined according to a formula $t12=t11+(n+1) \times T1$, and the timestamp t22 of the second alignment end-of-frame packet is determined according to a formula $t22=t21+n \times T2$. Herein, n is a natural number and may be set to 1.

When the determined synchronization relationship between the first video stream and the second video stream is that the first video stream is synchronized with the second video stream, the timestamp t12 of the first alignment end-of-frame packet is determined according to a formula $t12=t11+k \times T1$, and the timestamp t22 of the second alignment end-of-frame packet is determined according to a formula $t22=t21+k \times T2$. Herein, k is a natural number and may be set to 1.

The timestamp of the first alignment end-of-frame packet and the timestamp of the second alignment end-of-frame packet that are determined in the implementation B1 are basically consistent, and timestamps that are of switching packets and that are determined based on this are also basically consistent. Therefore, it can be ensured that a to-be-switched-away stream and a to-be-switched-to stream are connected in a time dimension during switching, and a problem of frame redundancy or frame lack does not occur.

Implementation B2: In the implementation B2, a synchronization relationship between the first video stream and the second video stream is not considered, but it is assumed that the first video stream and the second video stream are synchronous. In this case, the timestamp t12 of the first alignment end-of-frame packet may be directly determined according to a formula $t12=t11+k \times T1$, and the timestamp t22 of the second alignment end-of-frame packet may be directly determined according to a formula $t22=t21+k \times T2$.

After the timestamp of the first alignment end-of-frame packet and the timestamp of the second alignment end-of-frame packet are determined, a first switching timestamp and a second switching timestamp are separately determined based on the timestamp of the first alignment end-of-frame packet and the timestamp of the second alignment end-of-frame packet in either of the following two implementations (an implementation Y1 and an implementation Y2).

Implementation Y1: The implementation Y1 is used to implement video stream switching at a frame boundary. In the implementation Y1, the timestamp of the first alignment end-of-frame packet of the first video stream is used as the first switching timestamp, and the timestamp of the second alignment end-of-frame packet of the second video stream is used as the second switching timestamp.

Implementation Y2: The implementation Y2 is used to implement video stream switching at a blanking interval.

For the first video stream, a timestamp of a data packet used to encapsulate blanking interval data of a sub-image next to, in time order, a sub-image corresponding to the timestamp of the first alignment end-of-frame packet may be determined as the first switching timestamp. For example, a sum of the timestamp of the first alignment end-of-frame packet of the first video stream and $\Delta tm$ is determined as the first switching timestamp, and $\Delta tm$ is a value belonging to an interval [tx, ty]. For example, $\Delta tm$ is tx or $(tx+ty)/2$. Herein, $tx=T1 \times SL1/L1$, $ty=T1 \times (SL1+1)/L1$, SL1 is a switching row number of a sub-image of the first video stream, and L1 is a total quantity of rows of pixels of the sub-image of the first video stream.

For the second video stream, a timestamp of a data packet used to encapsulate blanking interval data of a sub-image next to, in time order, a sub-image corresponding to the timestamp of the second alignment end-of-frame packet is determined as the second switching timestamp. For example, a sum of the timestamp of the second alignment end-of-frame packet of the second video stream and $\Delta tn$ is determined as the second switching timestamp, and $\Delta tn$ is a value belonging to an interval [tm, tn]. For example, $\Delta tn$ is tm or $(tm+tn)/2$. Herein, $tm=T2 \times SL2/L2$, $tn=T2 \times (SL2+1)/L2$, SL2 is a switching row number of a sub-image of the second video stream, and L2 is a total quantity of rows of pixels of the sub-image of the second video stream. It should be noted that $\Delta tm$ and $\Delta tn$ are calculated according to a same method. For example, $\Delta tm$ is calculated according to a formula $\Delta tm=T1 \times SL1/L1$ (in other words, $\Delta tm$ is tx), and $\Delta tn$ is calculated according to a formula $\Delta tn=T2 \times SL2/L2$ (in other words, $\Delta tn$ is tm).

The switching row number may depend on an SDI video standard. The SMPTE RP-168 specifies switching row numbers in most video formats. The switching row number SL1 of the first video and the switching row number SL2 of the second video are usually the same. L1 of the first video and L2 of the second video are also usually the same.

In Embodiment 1 of the present disclosure, the transmission device may determine the synchronization relationship between the first video stream and the second video stream based on the timestamp of the reference end-of-frame packet of the first video stream and the timestamp of the reference end-of-frame packet of the second video stream.

Device synchronization has a precision deviation. Therefore, timestamps of data packets sent from different video source devices at a same moment may have a deviation. In addition, data is transmitted in a form of a packet in an IP network, and a jitter of packet forwarding may cause some synchronization deviations. Therefore, if a timestamp deviation between two reference end-of-frame packets is less than a preset time difference threshold, it may be considered that the two video streams are synchronous. The time difference threshold for determining synchronization may be determined based on clock synchronization precision of a video source device in the network.

When determining that t1−t2>Δt1, the transmission device may determine that the first video stream is earlier than the second video stream. When determining that t2−t1>Δt1, the transmission device may determine that the first video stream is later than the second video stream. When determining that |t1−t2|<Δt2, the transmission device may determine that the first video stream is synchronized with the second video stream. Herein, t1 is the timestamp of the first reference end-of-frame packet, t2 is the timestamp of the second reference end-of-frame packet, Δt1 is a preset first time difference threshold, Δt2 is a preset second time difference threshold, both Δt1 and Δt2 are values greater than 0 and less than T, and Δt2 may be the same as Δt1 or may be less than Δt1. ϕt1 and Δt2 may be preset according to the following conditions: T/2<Δt1<T, and 0<Δt2<T/2. For example, Δt1 may be 3×T/4, and Δt2 may be T/4. T is duration of a single video frame. In this embodiment of the present disclosure, T may be preset or may be obtained through calculation based on preset video information (for example, a frame rate). In addition, because duration of single video frames of videos to which video streams that have a mutual switching requirement belongs is usually the same, T may alternatively be obtained through calculation based on a received data packet of either of the first video stream and the second video stream, for example, is obtained through calculation based on a difference between timestamps of two adjacent end-of-frame packets of the video stream.

S150: The transmission device switches, to the plurality of video streams of the second video based on the switching reference information of the switching packet of each video stream, from the plurality of video streams of the first video that are sent through the target output ports respectively corresponding to the plurality of video streams of the first video.

For the first video stream and the second video stream in each video stream pair, the transmission device switches, to the second video stream based on switching reference information of switching packets of the first video stream and the second video stream, the first video stream sent through a target output port corresponding to the first video stream.

In an implementation, the switching reference information of the first switching packet and the switching reference information of the second switching packet each are a sequence number, and the transmission device may not send, through the target output port, a received data packet that is of the first video stream and whose sequence number is greater than the first switching sequence number, but send, through the target output port, a received data packet that is of the second video stream and whose sequence number is greater than the second switching sequence number.

Because the first switching sequence number and the second switching sequence number are calculated sequence numbers of data packets that have not been received, when the first switching sequence number and the second switching sequence number are calculated, a data packet that is of the first video stream and whose sequence number is less than or equal to the first switching sequence number and a data packet that is of the second video stream and whose sequence number is less than or equal to the second switching sequence number are usually received. In step S150, the transmission device may determine, based on the sequence number of the received data packet of the first video stream, whether to send the data packet through the target output port, and send the data packet through the target output port as usual if the sequence number of the data packet is less than or equal to the first switching sequence number, or not send the data packet through the target output port if the sequence number of the data packet is greater than the first switching sequence number. Correspondingly, the transmission device may determine, based on the sequence number of the received data packet of the second video stream, whether to send the data packet through the target output port, and not send the data packet through the target output port as usual if the sequence number of the data packet is less than or equal to the second switching sequence number, or send the data packet through the target output port if the sequence number of the data packet is greater than the second switching sequence number.

In another implementation, the switching reference information of the first switching packet and the switching reference information of the second switching packet each are a timestamp, and the transmission device may not send, through the target output port, a received data packet that is of the first video stream and whose timestamp is greater than the first switching timestamp, but send, through the target output port, a received data packet that is of the second video stream and whose timestamp is greater than the second switching timestamp. In addition, the transmission device may further send, through the target output port, a received data packet that is of the first video stream and whose timestamp is less than or equal to the first switching timestamp, but not send, through the target output port, a received data packet that is of the second video stream and whose timestamp is less than or equal to the second switching timestamp.

In still another implementation, the switching reference information of the first switching packet and the switching reference information of the second switching packet each include a sequence number and a timestamp. For a received data packet of the first video stream, if an absolute value (Dif1) of a difference between a timestamp of the data packet and the timestamp of the first switching packet is greater than a threshold 1 and the timestamp of the data packet is greater than the timestamp of the first switching packet, or if Dif1 is less than or equal to the threshold 1 and a sequence number of the data packet is greater than the sequence number of the first switching packet, the data packet is not forwarded through the target output port. For a received data packet of the second video stream, if an absolute value (Dif2) of a difference between a timestamp of the data packet and the timestamp of the second switching packet is greater than a threshold 2 and the timestamp of the data packet is greater than the timestamp of the second switching packet, or if Dif2 is less than or equal to the threshold 2 and a sequence number of the data packet is greater than the sequence number of the second switching packet, the data packet is forwarded through the target output port. In addition, for a received data packet of the first video stream, if Dif1 is greater than the threshold 1 and a timestamp of the data packet is less than the timestamp of the first switching packet, or if Dif1 is less than or equal to the threshold 1 and a sequence number of the data packet is less than or equal to the sequence number of the first switching packet, the data packet is forwarded through the target output port. For a received data packet of the second video stream, if Dif2 is greater than the threshold 2 and a timestamp of the data packet is less than the timestamp of the second switching packet, or if Dif2 is less than or equal to the threshold 2 and a sequence number of the data packet is less than the sequence number of the second switching packet, the data packet is not forwarded through the target output port.

The threshold 1 and the threshold 2 may be the same or may be different. Each of the threshold 1 and the threshold 2 may be set to a value greater than or equal to T/4, and may be set to a value greater than or equal to T/4 and less than or equal to T*7/4, for example, T*3/4. Herein, T is duration of a single video frame of the first video stream or the second video stream.

For each of the first video stream and the second video stream, after it is determined that the video stream enters a stable state, for example, it is determined that a predetermined quantity (for example, M or 2M) of data packets of the data stream have been processed after step S150 starts to be performed or preset duration (for example, T or 2T) elapses after step S130 starts to be performed, there is a very low probability that a data packet that is of the data stream and whose sequence number or timestamp is less than or equal to a switching sequence number or a switching timestamp of the data stream is received. Therefore, sequence numbers or timestamps of received data packets of the data stream are no longer checked packet by packet to determine whether to send the data packet through the target output port, but state information for indicating whether a data stream (namely, the data stream) to which the data packet belongs is a data stream that needs to be sent is used to determine whether to send the data packet through the target output port. In this way, forwarding efficiency is improved. Herein, M is a quantity of packets used for a single sub-image of the video stream, and T is duration of a single video frame of the video stream.

To reduce impact on a downstream device to enable the downstream device to be unaware of switching, when forwarding a data packet of the second video stream, the transmission device may further modify information in the data packet of the second video stream.

Further, to improve consistency of video streams before and after switching, the transmission device may modify a value of a first field in the data packet of the second video stream, so that the value of the first field in the data packet that is of the second video stream and that is sent through the target output port after the switching is the same as a value of a first field in a data packet that is of the first video stream and that is sent through the target output port before the switching. The first field may be a multicast address field or a payload type field. If RTP is used for video stream transmission, the first field may alternatively be a synchronization source (SSRC) field. The first field may alternatively be a high bit rate media transport (HBRMT) layer parameter, for example, FRCount, defined in SMPTE 2022-6. FRCount is a frame count field in a high bit rate media payload header defined in SMPTE 2022-6, and represents a quantity of accumulated video frames in the video stream.

For one target output port, switching between a plurality of input video streams may need to be repeatedly performed. Therefore, a current to-be-switched-away stream may be a previous to-be-switched-to stream.

When sending each of the plurality of input video streams through the target output port, the transmission device may modify a value of a first field in a data packet of the video stream to a preset value, for example, modify a multicast address in the data packet of the video stream to a preset multicast address (for example, 239.0.2.1), or modify, to a value of a first field of the first to-be-switched-away stream, a value of a first field in a data packet of each to-be-switched-to stream sent through the target output port.

To improve continuity of video streams before and after switching, when sending the data packet of the second video stream after the switching, the transmission device may further modify a value of a second field in the data packet of the second video stream, so that the value of the second field in the data packet that is of the second video stream and that is sent through the target output port after the switching and a value of a second field in a data packet that is of the first video stream and that is sent through the target output port before the switching are consecutive. The value of the second field may be one or more of a sequence number, a frame number, a timestamp, and the like.

To ensure that the values (for example, sequence numbers) of the second fields are consecutive, the value of the second field in the to-be-sent data packet of the second video stream may be increased by $\Delta V$, where $\Delta V=V1-V2$, V1 is a value that is of a second field and that is carried when a data packet that is of the first video stream and whose sequence number is equal to the first switching sequence number is sent through the target output port, and V2 is a value that is of a second field and that is carried when a data packet that is of the second video stream and whose sequence number is equal to the second switching sequence number is received.

Before performing step S130, the transmission device may further perform step S115 to record target information of a latest end-of-frame packet of each video stream of the first video and target information of a latest end-of-frame packet of each video stream of the second video. The recorded target information includes at least one of a sequence number and a timestamp of the latest end-of-frame packet. Correspondingly, in step S130, the transmission device may determine the reference end-of-frame packet of each video stream based on the target information that is of the latest end-of-frame packet of each video stream and that is recorded in step S115.

The transmission device may start to perform step S115 before step S120. As described in step S110, the transmission device may receive video streams of a plurality of videos, send a video stream of one of the plurality of videos through the target output port, and switch, among the video streams of the plurality of videos, the video stream sent through the target output port. In this case, when starting to forward the video stream through the target output port, the transmission device starts to record target information of latest end-of-frame packets of the video streams of the plurality of videos. When the transmission device needs to switch between video streams of two of the videos subsequently, the transmission device may perform step S130 and step S140 based on recorded target information of latest end-of-frame packets of the video streams of the two videos, to determine switching reference information. Step S115 starts to be performed before step S120, so that step S130 can be immediately performed after the switching instruction is received.

The transmission device may alternatively start to perform step S115 after step S120. To be specific, after receiving the switching instruction, the transmission device starts to record target information of latest end-of-frame packets of to-be-switched video streams, and then performs step S130 and step S140 based on the recorded target information of the latest end-of-frame packets of the to-be-switched video streams, to determine switching reference information of switching packets. Step S115 starts to be performed after step S120. It should be noted that, if the switching instruction includes a plurality of instructions that each correspond to one video stream pair, and the plurality of instructions are sent through different notification packets, when receiving an instruction for each video stream pair, the transmission device may start to record target information of latest end-of-frame packets of a to-be-switched-away stream and a to-be-switched-to stream in the video stream pair.

If step S115 starts to be performed before step S120, for each video stream of the plurality of videos, when receiving the first end-of-frame packet in the video stream, the transmission device may record target information of the end-of-frame packet as target information of a latest end-of-frame packet of the video stream, and update the target information of the latest end-of-frame packet of the video stream based on a subsequently received data packet of the video stream. Further, after receiving the switching instruction, the transmission device immediately performs step S130 and step S140 to calculate switching reference information (such as a sequence number) of a switching packet based on the target information (such as a sequence number) that is of the latest end-of-frame packet and that is recorded before the switching instruction is received. As shown in FIG. 4A, a switching sequence number of the stream 12 is calculated based on the sequence number 10 that is of the latest end-of-frame packet 201 of the stream 12 of the first video and that is recorded before the switching instruction is received.

If step S115 starts to be performed after step S120, for each video stream of the first video and the second video, when receiving the first end-of-frame packet in the video stream, the transmission device may record target information of the end-of-frame packet as target information of a latest end-of-frame packet of the video stream. When another end-of-frame packet of a video stream is received, if the first end-of-frame packet of another video stream of a video to which the video stream belongs is not received, target information of a latest end-of-frame packet of the video stream may be updated, until the first end-of-frame packets of all video streams of the video are received. In addition, if a quantity of packets used for a single sub-image is calculated for each video stream based on sequence numbers of adjacent end-of-frame packets, at least two end-of-frame packets are received for each video stream before a switching sequence number is calculated, and each time an end-of-frame packet is received, target information of the end-of-frame packet is recorded as target information of a latest end-of-frame packet of a video stream to which the end-of-frame packet belongs. In addition, a difference between the sequence numbers of the two received adjacent end-of-frame packets may be used as the quantity of packets used for the single sub-image of the video stream to which the end-of-frame packets belong, and a difference between timestamps of the two received adjacent end-of-frame packets may be used as duration of a single video frame of the video to which the video stream belongs.

As shown in FIG. 4B, a switching sequence number of the stream 12 is calculated based on the sequence number 10 that is of the latest end-of-frame packet 203 of the stream 12 of the first video and that is recorded after the switching instruction is received.

The transmission device may update the target information of the latest end-of-frame packet of each video stream in the following manner.

Each time the transmission device receives an end-of-frame packet of the video stream, the transmission device may update a sequence number of the latest end-of-frame packet of the video stream to a sequence number of the end-of-frame packet, and update a timestamp of the latest end-of-frame packet of the video stream to a timestamp of the end-of-frame packet.

During updating, the transmission device may also consider an inter-frame packet disorder and an end-of-frame packet loss that may occur. If the inter-frame packet disorder occurs, that is, a non-end-of-frame packet of a next frame arrives earlier than an end-of-frame packet of a current frame or is processed by the transmission device earlier than the end-of-frame packet of the current frame, or the end-of-frame packet loss occurs, the sequence number of the latest end-of-frame packet of the video stream may alternatively be a sequence number that is of the end-of-frame packet and that is estimated based on the non-end-of-frame packet whose sequence number is greater than that of the end-of-frame packet that is not received. Correspondingly, the transmission device may perform updating in the following manner.

When determining that a received data packet of the video stream is not an end-of-frame packet and a sequence number of the data packet is greater than a sum of the sequence number of the latest end-of-frame packet of the video stream and a quantity M of packets used for a single sub-image of the video stream, the transmission device increases the recorded sequence number of the latest end-of-frame packet of the video stream by M. If the target information further includes a timestamp, correspondingly, the transmission device increases the recorded timestamp of the latest end-of-frame packet of the video stream by duration T of a single video frame. When determining that a received data packet of the video stream is an end-of-frame packet, the transmission device may directly perform an update operation, that is, update the sequence number of the latest end-of-frame packet of the video stream to a sequence number of the data packet, and update the timestamp of the latest end-of-frame packet of the video stream to a timestamp of the data packet. The transmission device may further determine whether the timestamp of the data packet is greater than the recorded timestamp of the latest end-of-frame packet of the video stream, and perform the update operation only when the timestamp of the data packet is greater than the recorded timestamp of the latest end-of-frame packet of the video stream.

In addition, for each of the first video and the second video, the transmission device may further record a largest timestamp in timestamps of latest end-of-frame packets of all video streams of the video.

The following uses a specific implementation to describe specific implementation of step S115 in detail.

The transmission device creates a switching child table. If step S115 starts to be performed before step S120, the switching child table may include records of the video streams of the plurality of videos. If step S115 starts to be performed after step S120, the switching child table may include records of video streams of only two to-be-switched videos (namely, the first video and the second video), as shown in Table 1. It should be noted that the switching child table may be one table, or may be a plurality of tables. For example, information about a plurality of video streams of each video is recorded in one table. For another example, information about each video stream is recorded in one table.

TABLE 1

| Outport | Flow | State | FrameTime | FramePackets | FT_TS | FT_SN | SW_TS | SW_SN |
|---|---|---|---|---|---|---|---|---|
| 6 | 21 | SW_Discard | T2 | M2 | T21 | SN21 | TS21 | SW_SN21 |
| 6 | 11 | SW_Forwarding | T1 | M1 | T11 | SN11 | TS11 | SW_SN11 |
| 6 | 22 | SW_Discard | T2 | M2 | T22 | SN22 | TS22 | SW_SN22 |
| 6 | 12 | SW_Forwarding | T1 | M1 | T12 | SN12 | TS12 | SW_SN12 |
| 6 | 23 | SW_Discard | T2 | M2 | T23 | SN23 | TS23 | SW_SN23 |
| 6 | 13 | SW_Forwarding | T1 | M1 | T13 | SN13 | TS13 | SW_SN13 |
| 6 | 24 | SW_Discard | T2 | M2 | T24 | SN24 | TS24 | SW_SN24 |
| 6 | 14 | SW_Forwarding | T1 | M1 | T14 | SN14 | TS14 | SW_SN14 |

The switching table may include fields FT_TS and FT_SN, and a value of FT_TS and a value of FT_SN that correspond to each video stream are respectively a timestamp and a sequence number of a latest end-of-frame packet of the video stream.

The video stream switching table may further include any one or any combination of fields Flow, Outport, State, FrameTime, and FramePackets. A value of Flow is used to identify a corresponding video stream. A value of Outport corresponding to each video stream is used to record a port number of an output port corresponding to the video stream, that is, to indicate a specific port that is of the transmission device and from which the video stream is forwarded. A value of State corresponding to each video stream is used to record a current state of the video stream. SW_Forwarding indicates that the video stream is a video stream forwarded by the transmission device through a corresponding target output port, and SW_Discard indicates that the video stream is a video stream not forwarded by the transmission device through a corresponding target output port. A value of FrameTime corresponding to each video stream is used to record duration of a single video frame of the video stream. If RTP is used for video stream transmission, a unit of FrameTime is the same as a unit of a TS field in an RTP header. A value of FramePackets corresponding to each video stream is used to record a quantity of packets used for a single sub-image of the video stream.

The video stream switching table may further include SW_SN, and a value of SW_SN corresponding to each video stream is used to record a switching sequence number of the video stream. The transmission device may further create a switching summary table. If step S115 starts to be performed before step S120, the switching summary table may include information about each of the plurality of videos. If step S115 starts to be performed after step S120, the switching summary table may include information about only two to-be-switched videos (namely, the first video and the second video), as shown in Table 2.

TABLE 2

| TSmax1 | TSmax2 | Bitmap1 | Bitmap2 |
|---|---|---|---|

The switching summary table includes a TSmax field (TSmax1) of the first video and a TSmax field (TSmax2) of the second video. The switching summary table may further include a bitmap field (Bitmap1) of the first video and a bitmap field (Bitmap2) of the second video. A value of TSmax1 is used to record a largest timestamp in timestamps of latest end-of-frame packets of all video streams of the first video, and a value of TSmax2 is used to record a largest timestamp in timestamps of latest end-of-frame packets of all video streams of the second video. A value of Bitmap1 is used to indicate that target information of latest end-of-frame packets of specific video streams of the first video is recorded in the switching child table. For example, 1111 indicates that target information of latest end-of-frame packets of the streams 11, 12, 13, and 14 is recorded, and 1010 indicates that target information of latest end-of-frame packets of the streams 11 and 13 is recorded. An initial value consists of only 0. A value of Bitmap2 is used to indicate that target information of latest end-of-frame packets of specific video streams of the second video is recorded in the switching child table. An initial value consists of only 0.

When both Bitmap1 and Bitmap2 are 1111, it indicates that switching reference information of a switching packet may be calculated, that is, it indicates that information required for performing step S130 and step S140 is available. If step S115 starts to be performed before step S120, when step S120 is performed, both Bitmap1 and Bitmap2 are 1111, that is, target information of latest end-of-frame packets of all video streams of the first video and the second video is recorded in the switching child table. Therefore, step S130 may be performed immediately after step S120 is performed. If step S115 starts to be performed after step S120, step S130 and step S140 may be performed when both Bitmap1 and Bitmap2 are 1111.

Correspondingly, in a process of performing step S130 and step S140, for each of the first video and the second video, an end-of-frame packet corresponding to a value of TSmax (for example, TSmax1) of the video may be used as a reference end-of-frame packet, and the value of TSmax is a timestamp of the reference end-of-frame packet. For each video stream other than a reference video stream of the video, a synchronization relationship between the video stream and a video stream (namely, the reference video stream) to which the reference end-of-frame packet belongs is determined based on the value of TSmax and a value of FT_TS corresponding to the video stream in the switching child table, and switching reference information of the reference end-of-frame packet of the video stream is determined based on the synchronization relationship. For example, a sequence number of the reference end-of-frame packet of the video stream is determined based on the synchronization relationship and a value of FT_SN corresponding to the video stream in the switching child table. For another example, a timestamp of the reference end-of-frame packet of the video stream is determined based on the synchronization relationship and the value of FT_TS corresponding to the video stream in the switching child table. The synchronization relationship between the video stream and the reference video stream may be further determined based on the value of TSmax of the video and the value of FT_TS corresponding to the video stream in the switching child table.

If the switching reference information includes a sequence number, a determined sequence number of a reference end-of-frame packet of each video stream may be updated into an FT_SN field corresponding to the video stream in the switching child table, and then a sequence number of a switching packet of the video stream may be determined based on a value of the FT_SN field corresponding to the video stream in the switching child table.

If the switching reference information includes a timestamp, a determined timestamp of a reference end-of-frame packet of each video stream may be updated into an FT_TS field corresponding to the video stream in the switching child table, and then a timestamp of a switching packet of the video stream may be determined based on a value of the FT_TS field corresponding to the video stream in the switching child table.

A process of updating the switching child table and the switching summary table is as follows In the following description of the process, any video stream in the switching child table is referred to as a video stream A.

For the video stream A, when any data packet (which is referred to as a packet a below) of the video stream A is received, whether the packet a is an end-of-frame packet is first determined.

An RTP packet is used as an example. According to an RTP packet header format stipulated by RFC 3550, a value of an M (marker) field in an RTP packet header is used to indicate whether the RTP packet is an end-of-frame packet. If the value of M is 1, it indicates that the RTP packet is an end-of-frame packet. If the value of M is 0, it indicates that the RTP packet is not an end-of-frame packet.

A value of a sequence number (SN) field in the RTP packet header indicates a sequence number of the RTP packet in an RTP stream, and sequence numbers of all RTP packets in a same RTP stream monotonically increase by 1. The RTP packet header further includes a timestamp (TS). All video source devices in a multimedia communications system (for example, a TV production and broadcasting system) keep clock-synchronous. For RTP packets sent at a same moment, values of the timestamp fields are very close to each other. Therefore, the values of the timestamp fields may be used to determine whether video frames in different video streams are video frames at a same moment, to align different video streams during switching, so as to implement connection in a time dimension during the switching.

If it is determined that the packet a is an end-of-frame packet and is the first end-of-frame packet that is of the video stream A and that is received after step S115 is performed, a value of a TS field and a value of an SN field that are of the packet a are respectively recorded in an FT_TS field and an FT_SN field that correspond to the video stream A in the switching child table. Further, if a value of a TSmax (for example, TSmax1) field corresponding to a video to which the video stream A belongs is an initial value or null, or the value of the TSmax field is less than the value of the TS field of the packet a, the value of the TS field of the packet a is recorded as the value of the TSmax field, and a bit corresponding to the video stream A in a bitmap (for example, Bitmap1) field of the video to which the video stream A belongs in the switching summary table is recorded as 1.

If it is determined that the packet a is an end-of-frame packet but is not the first end-of-frame packet of the video stream A, values of an FT_TS field and an FT_SN field that correspond to the video stream A in the switching child table may be respectively updated to values of a TS field and an SN field of the packet a directly. Alternatively, the value of the TS field of the packet a may be compared with the value of the FT_TS field corresponding to the video stream A in the switching child table. If the value of the TS field of the packet a is greater than the value of the FT_TS field corresponding to the video stream A in the switching child table, the values of the FT_TS field and the FT_SN field that correspond to the video stream A in the switching child table are respectively updated to the values of the TS field and the SN field of the packet a. If the value of the TS field of the packet a is less than the value of the FT_TS field corresponding to the video stream A in the switching child table, the values of the FT_TS field and the FT_SN field that correspond to the video stream A in the switching child table are not updated. Further, if a value of a TSmax field corresponding to a video to which the video stream A belongs is less than the value of the TS field of the packet a, the value of the TS field of the packet a is recorded as the value of the TSmax field.

If it is determined that the packet a is not an end-of-frame packet, the switching child table and the switching summary table may not be directly updated based on the packet a, but whether an inter-frame disorder occurs may be determined, and whether to update the switching child table and the switching summary table is determined based on a determining result. Further, if a sequence number of the packet a is greater than a sum of M and a value of an FT_SN field corresponding to the video stream A, that is, the packet a arrives earlier than an end-of-frame packet of a previous frame, the end-of-frame packet of the previous frame may encounter a disorder or a packet loss. In this case, a sum of a value of an FT_TS field and T may be used as an estimated timestamp of the end-of-frame packet, and the sum of the value of the FT_SN field and M may be used as an estimated sequence number of the end-of-frame packet. In addition, the values of the FT_TS field and the FT_SN field that correspond to the video stream A in the switching child table are updated by using the estimated timestamp and the estimated sequence number. To be specific, the value of the FT_TS field is increased by T, and the value of the FT_SN field is increased by M. Further, if the value of the TSmax field corresponding to the video to which the video stream A belongs is less than an updated value of the FT_TS field, the updated value of the FT_TS field is recorded as the value of the TSmax field.

Figure 6:
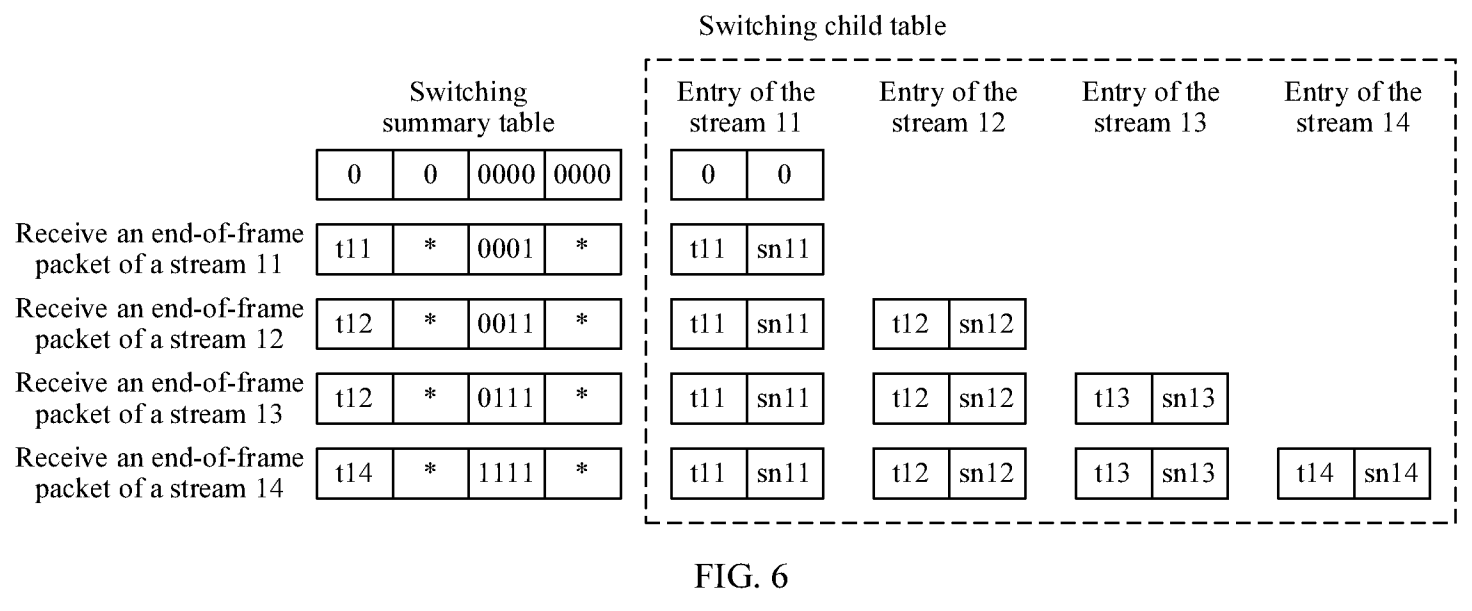

With reference to FIG. 6, the following uses the first video as an example to describe an example of the process of updating the switching child table and the switching summary table. As shown in FIG. 6, it is assumed that the first video has four video streams a stream 11, a stream 12, a stream 13, and a stream 14, and end-of-frame packets of the stream 11, the stream 12, the stream 13, and the stream 14 are sequentially received.

(1) The end-of-frame packet of stream 11 is received. A timestamp of the end-of-frame packet is t11, and a sequence number of the end-of-frame packet is sn11. t11 and sn11 are respectively recorded in an FT_TS field and an FT_SN field that correspond to the stream 11 in the switching child table, t11 is recorded in a TSmax1 field in the switching summary table, and the first bit of Bitmap1 is set to 1. In other words, Bitmap1 is 0001.

(2) The end-of-frame packet of the stream 12 is received. A timestamp of the end-of-frame packet is t12, and a sequence number of the end-of-frame packet is sn12, where t12>t11. t12 and sn12 are respectively recorded in an FT_TS field and an FT_SN field that correspond to the stream 12 in the switching child table. Because t12>t11, the value of the TSmax1 field in the switching summary table is updated to t12, and the second bit of Bitmap1 is set to 1. In other words, Bitmap1 is 0011.

(3) The end-of-frame packet of the stream 13 is received. A timestamp of the end-of-frame packet is t13, and a sequence number of the end-of-frame packet is sn13, where t13<t12. t13 and sn13 are respectively recorded in an FT_TS field and an FT_SN field that correspond to the stream 13 in the switching child table. Because t13<t12, the value of the TSmax1 field in the switching summary table is not updated. The third bit of Bitmap1 is set to 1. In other words, Bitmap1 is 0111.

(4) The end-of-frame packet of the stream 14 is received. A timestamp of the end-of-frame packet is t14, and a sequence number of the end-of-frame packet is sn14, where t14>t12. t14 and sn14 are respectively recorded in an FT_TS field and an FT_SN field that correspond to the stream 14 in the switching child table. Because t14>t12, the value of the TSmax1 field in the switching summary table is updated to t14, and the fourth bit of Bitmap1 is set to 1. In other words, Bitmap1 is 1111.

Figure 7:
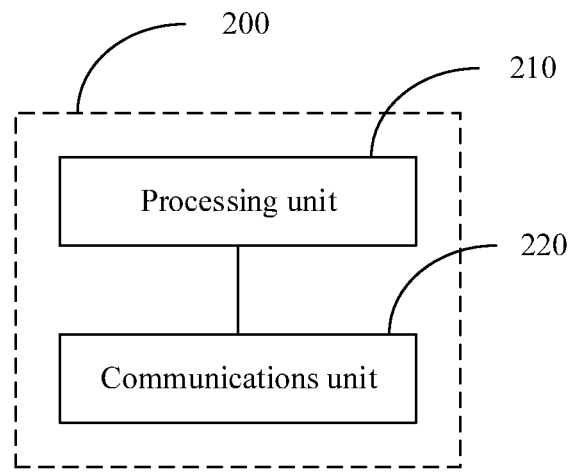
FIG. 7 is a schematic structural diagram of a transmission device according to an embodiment of the present disclosure.

According to Embodiment 1 of the present disclosure, Embodiment 2 of the present disclosure provides a transmission device 200. As shown in FIG. 7, the transmission device 200 includes a processing unit 210 and a communications unit 220.

The communications unit 220 is configured to receive a plurality of video streams of a first video and a plurality of video streams of a second video, send the plurality of video streams of the first video through target output ports respectively corresponding to the plurality of video streams of the first video, and receive a switching instruction used to instruct to switch from the video streams of the first video to the video streams of the second video, where the plurality of video streams of the first video are used to encapsulate different sub-images of a video frame of the first video, and the plurality of video streams of the second video are used to encapsulate different sub-images of a video frame of the second video.

The processing unit 210 is configured to, after the communications unit 220 receives the switching instruction, determine switching reference information of a reference end-of-frame packet of each video stream of the first video, and determine switching reference information of a switching packet of the video stream based on the switching reference information of the reference end-of-frame packet of the video stream, and determine switching reference information of a reference end-of-frame packet of each video stream of the second video, and determine switching reference information of a switching packet of the video stream based on the switching reference information of the reference end-of-frame packet of the video stream, where reference end-of-frame packets of all video streams of the first video are used to encapsulate data of a same video frame of the first video, and reference end-of-frame packets of all video streams of the second video are used to encapsulate data of a same video frame of the second video.

The communications unit 220 is further configured to switch, to the plurality of video streams of the second video based on the switching reference information of the switching packet of each video stream, from the plurality of video streams of the first video that are sent through the target output ports respectively corresponding to the plurality of video streams of the first video.

Function units described in Embodiment 2 of the present disclosure may be configured to implement operations performed by the transmission device in the method in Embodiment 1. Further, the communications unit 220 is configured to communicate with another device, for example, receive control signaling, receive a data packet, forward a data packet, or modify information in a data packet when forwarding the data packet. The processing unit 210 is configured to determine switching sequence numbers of a to-be-switched-to stream and a to-be-switched-away stream, and the like.

According to the transmission device 200 provided in Embodiment 2 of the present disclosure, during video stream switching, a location of a data packet sent before the switching and a location of a data packet sent after the switching are considered. Therefore, damage caused by a switch operation to a transmitted video picture can be effectively alleviated.

Figure 8:
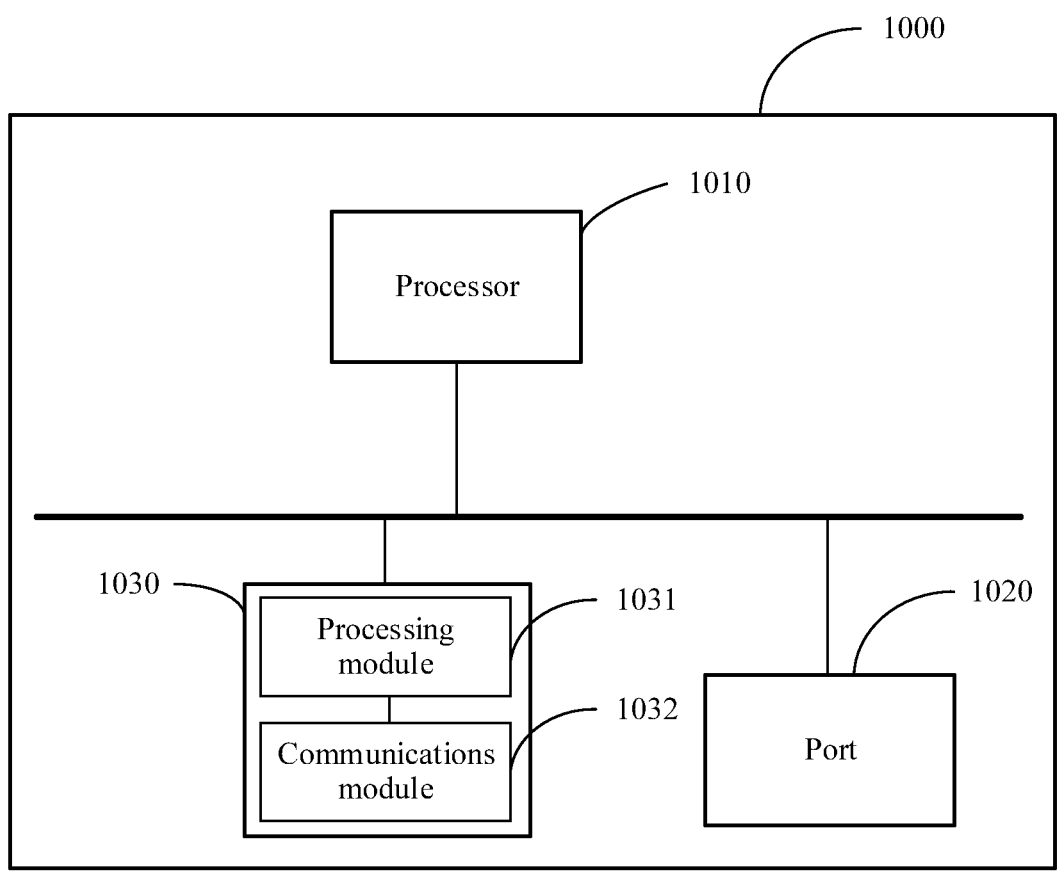
FIG. 8 is a schematic structural diagram of a transmission device according to another embodiment of the present disclosure.

According to Embodiment 1 of the present disclosure, Embodiment 3 of the present disclosure provides a transmission device 1000. As shown in FIG. 8, the transmission device 1000 includes a processor 1010 and a port 1020.

The processor 1010 is configured to implement an operation performed by the transmission device in the method 100 provided in Embodiment 1 of the present disclosure, and communicate with another device through the port 1020. The processor 1010 may be a central processing unit (CPU), an application-specific integrated circuit (ASIC), or one or more integrated circuits configured to implement the embodiments of the present disclosure.

As shown in FIG. 8, the transmission device 1000 may further include a memory 1030. The processor 1010 and the memory 1030 may implement mutual communication through a bus. The memory 1030 is configured to store a computer operation instruction, and may be a high-speed random-access memory (RAM), or may be a non-volatile memory. The processor 1010 may execute the computer operation instruction stored in the memory 1030, and the processor 1010 executes the computer operation instruction, so that the transmission device 1000 performs the operations performed by the transmission device in the method described in Embodiment 1. During specific implementation, the memory 1030 may include a processing module 1031 and a communications module 1032, which respectively store functions used to implement the processing unit 210 and the communications unit 220 shown in FIG. 7. Correspondingly, the processor 1010 further implements a function of the processing unit 210 by executing an instruction in the processing module 1031, and implements a function of the communications unit 220 by executing an instruction in the communications module 1032.

According to the transmission device 1000 provided in Embodiment 3 of the present disclosure, during video stream switching, a location of a data packet sent before the switching and a location of a data packet sent after the switching are considered. Therefore, damage caused by a switch operation to a transmitted video picture can be effectively alleviated.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or another programmable apparatus. The computer instruction may be stored in a computer-readable storage medium, or transmitted from one computer-readable storage medium to another computer-readable storage medium. The computer-readable storage medium may be any available medium accessible to a computer. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

What is claimed is:

1. A method implemented by a transmission device, wherein the method comprises:
receiving a plurality of first video streams of a first video and a plurality of second video streams of a second video, wherein the plurality of first video streams encapsulates different sub-images of a video frame of the first video, and wherein the plurality of second video streams encapsulates different sub-images of a second video frame of the second video;
sending the first video streams through target output ports corresponding to the first video streams;
receiving a switching instruction instructing to switch from the first video streams to the second video streams;
determining first switching reference information of a reference end-of-frame packet of each of the first video streams;
determining second switching reference information of a switching packet of each of the first video streams based on the first switching reference information;
determining third switching reference information of a reference end-of-frame packet of each of second video streams;
determining fourth switching reference information of a switching packet of each of the second video streams based on the third switching reference information, wherein reference end-of-frame packets of all the first video streams encapsulate data of a same video frame of the first video, and wherein reference end-of-frame packets of all the second video streams encapsulate data of a same video frame of the second video; and
switching from the first video streams to the second video streams based on the second switching reference information and the fourth switching reference information.

2. The method of claim 1, further comprising:
further determining the first switching reference information based on a first synchronization relationship among all the first video streams; and
further determining the third switching reference information based on a second synchronization relationship among all the second video streams.

3. The method of claim 1, wherein determining the first switching reference information comprises:
determining fifth switching reference information of a reference end-of-frame packet of a first reference video stream of the first video based on a first synchronization reference packet of the first video, wherein the first reference video stream is one of the first video streams, wherein the first synchronization reference packet is an $x^{th}$-to-last end-of-frame packet of the first reference video stream, wherein the first synchronization reference packet is received before determining the first switching reference information, and wherein x is a natural number; and
determining, for each of the first video streams other than the first reference video stream, sixth switching reference information of a reference end-of-frame packet of a corresponding first video stream based on seventh switching reference information of an $x^{th}$-to-last end-of-frame packet of the corresponding first video stream, wherein the reference end-of-frame packet of the corresponding first video stream is received before determining the sixth switching reference information and a first synchronization relationship between the corresponding first video stream and the first reference video stream, and
wherein determining the third switching reference information comprises:
determining eighth switching reference information of a reference end-of-frame packet of a second reference video stream of the second video based on a second synchronization reference packet of the second video, wherein the second reference video stream is one of the second video streams, and wherein the second synchronization reference packet is an $x^{th}$-to-last end-of-frame packet of the second reference video stream and is received before determining the third switching reference information; and
determining, for each of the second video streams other than the second reference video stream, ninth switching reference information of a reference end-of-frame packet of corresponding second video stream based on tenth switching reference information of an $x^{th}$-to-last end-of-frame packet of the corresponding second video stream that is received before determining the ninth switching reference information and a second synchronization relationship between the corresponding second video stream and the second reference video stream.

4. The method of claim 3, further comprising:
for each of the first video stream other than the first reference video stream;
setting the seventh switching reference information as the sixth switching reference information when the corresponding first video stream is synchronized with the first reference video stream;
setting eleventh switching reference information of a next end-of-frame packet of the $x^{th}$-to-last end-of-frame packet of the corresponding first video stream that is received before determining the sixth switching reference information as the sixth switching reference information when the corresponding first video stream is later than the first reference video stream; and
setting twelfth switching reference information of a previous end-of-frame packet of the $x^{th}$-to-last end-of-frame packet of the corresponding first video stream that is received before determining the sixth switching reference information as the sixth switching reference information when the corresponding first video stream is earlier than the first reference video stream; and
for each of second video streams other than the second reference video stream;
setting the tenth switching reference information as the ninth switching reference information when the corresponding second video stream is synchronized with the second reference video stream;
setting thirteenth switching reference information of a next end-of-frame packet of the $x^{th}$-to-last end-of-frame packet of the corresponding second video stream that is received before determining the ninth switching reference information as the ninth switching reference information when the corresponding second video stream is later than the second reference video stream; and setting fourteenth switching reference information of a previous end-of-frame packet of the $x^{th}$-to-last end-of-frame packet of the corresponding second video stream that is received before determining the ninth switching reference information as the ninth switching reference information when the corresponding second video stream is earlier than the second reference video stream.

5. The method of claim 3, further comprising:
determining, for each of the first video streams other than the first reference video stream, the first synchronization relationship based on a first timestamp of the first synchronization reference packet and a second timestamp of the $x^{th}$-to-last end-of-frame packet of the corresponding first video stream that is received before determining a first sequence number of the reference end-of-frame packet of the corresponding first video stream; and determining, for each of the second video streams other than the second reference video stream, the second synchronization relationship based on a third timestamp of the second synchronization reference packet and a fourth timestamp of the $x^{th}$-to-last end-of-frame packet of the corresponding second video stream that is received before determining a second sequence number of the reference end-of-frame packet of the corresponding second video stream.

6. The method of claim 1, wherein the first switching reference information comprises a first sequence number, and wherein the third switching reference information comprises a second sequence number.

7. The method of claim 6, wherein the first video streams comprise a third video stream, wherein the second video streams comprise a fourth video stream corresponding to the third video stream, and wherein the method further comprises:
either:
  determining a third sequence number of a first alignment end-of-frame packet of the third video stream based on a fourth sequence number of a reference end-of-frame packet of the third video stream and a synchronization relationship between the third video stream and the fourth video stream, and setting the third sequence number as a fifth sequence number of a switching packet of the third video stream; or
  setting a sixth sequence number of a data packet used to encapsulate blanking interval data of a sub-image next to, in time order, a sub-image to which video data in the first alignment end-of-frame packet belongs as the fifth sequence number; and
either:
  determining a seventh sequence number of a second alignment end-of-frame packet of the fourth video stream based on an eighth sequence number of a reference end-of-frame packet of the fourth video stream and the synchronization relationship, and setting the seventh sequence number as a ninth sequence number of a switching packet of the fourth video stream; or
  setting a tenth sequence number of a data packet used to encapsulate blanking interval data of a sub-image next to, in time order, a sub-image to which video data in the second alignment end-of-frame packet belongs as the ninth sequence number, wherein the first alignment end-of-frame packet corresponds to the second alignment end-of-frame packet in terms of time.

8. The method of claim 7, further comprising:
when the synchronization relationship indicates that the third video stream is earlier than the fourth video stream:
  setting a sum of the fourth sequence number and m×M1 as the third sequence number, wherein M1 is a quantity of data packets required for encapsulating one sub-image of the third video stream, and wherein m is a natural number; and
  setting a sum of the eighth sequence number and (m+1)×M2 as the seventh sequence number, wherein M2 is a quantity of data packets required for encapsulating one sub-image of the fourth video stream;
when the synchronization relationship indicates that the third video stream is later than the fourth video stream:
  setting a sum of the fourth sequence number and (n+1)×M1 as the third sequence number, wherein n is a natural number; and
  setting a sum of the eighth sequence number and n×M2 as the seventh sequence number; and
when the synchronization relationship indicates that the third video stream is synchronized with the fourth video stream;
  setting a sum of the fourth sequence number and k×M1 as the third sequence number, wherein k is a natural number; and
  setting a sum of the eighth sequence number and k×M2 as the seventh sequence number.

9. The method of claim 1, wherein the first switching reference information comprises a first timestamp, and wherein the third switching reference information comprises a second timestamp.

10. The method of claim 1, wherein the first video streams comprise a third video stream, wherein the second video streams comprise a fourth video stream corresponding to the third video stream, and wherein the method further comprises:
sending, through a target output port corresponding to the third video stream, a first data packet of the fourth video stream; and
sending, through the target output port, a second data packet of the third video stream,
wherein a first value of a first field in the first data packet is same as a second value of a first field in the second data packet, and wherein the first field in the first data packet and the first field in the second data packet are a multicast address field or a payload type field, or
wherein a third value of a second field in the first data packet and a fourth value of a second field in the second data packet are consecutive, wherein the second field in the first data packet and the second field in the second data packet are a sequence number field, a frame number field, or a timestamp field.

11. A transmission device comprising:
a non-transitory computer-readable storage medium configured to store programming instructions; and
a processor coupled to the non-transitory computer-readable storage medium, wherein the programming instructions cause the processor to be configured to:
  receive a plurality of first video streams of a first video, wherein the first video streams encapsulate sub-images of a first video frame of the first video;

receive a plurality of second video streams of a second video, wherein the second video streams encapsulate sub-images of a second video frame of the second video;
send first video streams through target output ports corresponding to the first video streams;
receive a switching instruction instructing to switch from the first video streams to the second video streams;
after receiving the switching instruction:
determine first switching reference information of a reference end-of-frame packet of each of the first video streams;
determine second switching reference information of a switching packet of each of the first video streams based on the first switching reference information;
determine third switching reference information of a reference end-of-frame packet of each of the second video streams;
determine fourth switching reference information of a switching packet of each of the second video streams based on the third switching reference information, wherein reference end-of-frame packets of all the first video streams encapsulate data of a same video frame of the first video, and wherein reference end-of-frame packets of all the second video streams encapsulate data of a same video frame of the second video; and
switch from the first video streams to the second video streams based on the second switching reference information and the fourth switching reference information.

12. The transmission device of claim 11, wherein the programming instructions further cause the processor to be configured to:
further determine the first switching reference information based on a first synchronization relationship among all the first video streams; and
further determine the third switching reference information based on a second synchronization relationship among all the second video streams.

13. The transmission device of claim 11, wherein the programming instructions further cause the processor to be configured to:
determine fifth switching reference information of a reference end-of-frame packet of a first reference video stream of the first video based on a first synchronization reference packet of the first video, wherein the first reference video stream is one of the first video streams, wherein the first synchronization reference packet is an $x^{th}$-to-last end-of-frame packet of the first reference video stream, wherein the first synchronization reference packet is received before determining the first switching reference information, and wherein x is a natural number;
determine, for each of the first video streams other than the first reference video stream, sixth switching reference information of a reference end-of-frame packet of a corresponding first video stream based on seventh switching reference information of an $x^{th}$-to-last end-of-frame packet of the corresponding first video stream that is received before determining the sixth switching reference information and a first synchronization relationship between the corresponding first video stream and the first reference video stream;

determine eighth switching reference information of a reference end-of-frame packet of a second reference video stream of the second video based on a second synchronization reference packet of the second video, wherein the second reference video stream is one of the second video streams, wherein the second synchronization reference packet is an $x^{th}$-to-last end-of-frame packet of the second reference video stream, and wherein the second synchronization reference packet is received before determining the third switching reference information; and
determine, for each of the second video streams other than the second reference video stream, ninth switching reference information of a reference end-of-frame packet of a corresponding second video stream based on tenth switching reference information of an $x^{th}$-to-last end-of-frame packet of the corresponding second video stream, wherein the reference end-of-frame packet of the corresponding second video stream is received before determining the ninth switching reference information and a second synchronization relationship between the corresponding second video stream and the second reference video stream.

14. The transmission device of claim 13, wherein the programming instructions further cause the processor to:
for each of the video streams other than the first reference video stream:
set the seventh switching reference information as the sixth switching reference information when the corresponding first video stream is synchronized with the first reference video stream;
set eleventh switching reference information of a next end-of-frame packet of the $x^{th}$-to-last end-of-frame packet of the corresponding first video stream that is received before determining the sixth switching reference information as the sixth switching reference information when the corresponding first video stream is later than the first reference video stream; and
set twelfth switching reference information of a previous end-of-frame packet of the $x^{th}$-to-last end-of-frame packet of the corresponding first video stream that is received before determining the sixth switching reference information as the sixth switching reference information when the corresponding first video stream is earlier than the first reference video stream; and
for each of the second video stream other than the second reference video stream:
set the tenth switching reference information as the ninth switching reference information when the corresponding second video stream is synchronized with the second reference video stream;
set thirteenth switching reference information of a next end-of-frame packet of the $x^{th}$-to-last end-of-frame packet of the corresponding second video stream that is received before determining the ninth switching reference information as the ninth switching reference information when the corresponding second video stream is later than the second reference video stream; and
set fourteenth switching reference information of a previous end-of-frame packet of the $x^{th}$-to-last end-of-frame packet of the corresponding second video stream that is received before determining the ninth switching reference information as the ninth switching reference information when the corresponding second video stream is earlier than the second reference video stream.

15. The transmission device of claim 13, wherein the programming instructions further cause the processor to:
   determine, for each of the first video streams other than the first reference video stream, the first synchronization relationship based on a first timestamp of the first synchronization reference packet and a second timestamp of the $x^{th}$-to-last end-of-frame packet of the corresponding first video stream that is received before determining a first sequence number of the reference end-of-frame packet of the corresponding first video stream; and
   determine, for each of the second video stream other than the second reference video stream, the second synchronization relationship based on a third timestamp of the second synchronization reference packet and a fourth timestamp of the $x^{th}$-to-last end-of-frame packet of the corresponding second video stream that is received before determining a second sequence number of the reference end-of-frame packet of the corresponding second video stream.

16. The transmission device of claim 11, wherein the first switching reference information comprises a first sequence number, and wherein the third switching reference information comprises a second sequence number.

17. The transmission device of claim 16, wherein the first video streams comprise a third video stream, wherein the second video streams comprise a fourth video stream corresponding to the third video stream, and wherein the programming instructions further cause the processor to:
   either:
      determine a third sequence number of a first alignment end-of-frame packet of the third video stream based on a fourth sequence number of a reference end-of-frame packet of the third video stream and a synchronization relationship between the third video stream and the fourth video stream, and set the third sequence number as a fifth sequence number of a switching packet of the third video stream; or
      set a sixth sequence number of a data packet used to encapsulate blanking interval data of a sub-image next to, in time order, a sub-image to which video data in the first alignment end-of-frame packet belongs as the fifth sequence number; and
   either:
      determine a seventh sequence number of a second alignment end-of-frame packet of the fourth video stream based on an eighth sequence number of a reference end-of-frame packet of the fourth video stream and the synchronization relationship, and set the seventh sequence number as a ninth sequence number of a switching packet of the fourth video stream; or
      set a tenth sequence number of a data packet used to encapsulate blanking interval data of a sub-image next to, in time order, a sub-image to which video data in the second alignment end-of-frame packet belongs as the ninth sequence number, wherein the first alignment end-of-frame packet corresponds to the second alignment end-of-frame packet in terms of time.

18. The transmission device of claim 17, wherein the programming instructions further cause the processor to be configured to:
   when the synchronization relationship indicates that the third video stream is earlier than the fourth video stream:
      set a sum of the fourth sequence number and m×M1 as the third sequence number, wherein M1 is a quantity of data packets required for encapsulating one sub-image of the third video stream, and wherein m is a natural number; and
      set a sum of the eighth sequence number and (m+1)×M2 as the seventh sequence number, wherein M2 is a quantity of data packets required for encapsulating one sub-image of the second video stream;
   when the synchronization relationship indicates that the third video stream is later than the fourth video stream:
      set a sum of the fourth sequence number and (n+1)×M1 as the third sequence number, wherein n is a natural number; and
      set a sum of the eighth sequence number and n×M2 as the seventh sequence number; and
   when the synchronization relationship indicates that the third video stream is synchronized with the fourth video stream:
      set a sum of the fourth sequence number and k×M1 as the third sequence number, wherein k is a natural number; and
      set a sum of the eighth sequence number and k×M2 as the seventh sequence number.

19. The transmission device of claim 11, wherein the first switching reference information comprises a first timestamp, and wherein the third switching reference information comprises a second timestamp.

20. The transmission device of claim 11, wherein the first video streams comprise a third video stream, wherein the second video streams comprise a fourth video stream corresponding to the third video stream, and wherein the programming instructions farther cause the processor to be configured to:
   send, through a target output port corresponding to the third video stream, a first data packet of the fourth video stream; and
   send, through the target output port, a second data packet of the third video stream,
   wherein a first value of a first field in the first data packet is same as a second value of a first field in the second data packet, and wherein the first field in the first data packet and the first field in the second data packet are a multicast address field or a payload type field, or
   wherein a third value of a second field in the first data packet and a fourth value of a second field in the second data packet are consecutive, wherein the second field in the first data packet and the second field in the second data packet are a sequence number field, a frame number field, or a timestamp field.

* * * * *